July 20, 1943. L. R. COOK ET AL Re. 22,350

KEYBOARD PERFORATOR AND COUNTER

Original Filed Nov. 20, 1936 6 Sheets-Sheet 1

INVENTOR
LEWIS R. COOK
BY MAURUS T. GOETZ
H. B. Whitfield
ATTORNEY

July 20, 1943. L. R. COOK ET AL Re. 22,350

KEYBOARD PERFORATOR AND COUNTER

Original Filed Nov. 20, 1936 6 Sheets-Sheet 2

INVENTOR
LEWIS R. COOK
MAURUS T. GOETZ
BY H. B. Whitfield
ATTORNEY

KEYBOARD PERFORATOR AND COUNTER

Original Filed Nov. 20, 1936 6 Sheets-Sheet 3

INVENTOR
LEWIS R. COOK
MAURUS T. GOETZ
BY H. B. Whitfield
ATTORNEY

KEYBOARD PERFORATOR AND COUNTER
Original Filed Nov. 20, 1936 6 Sheets-Sheet 4
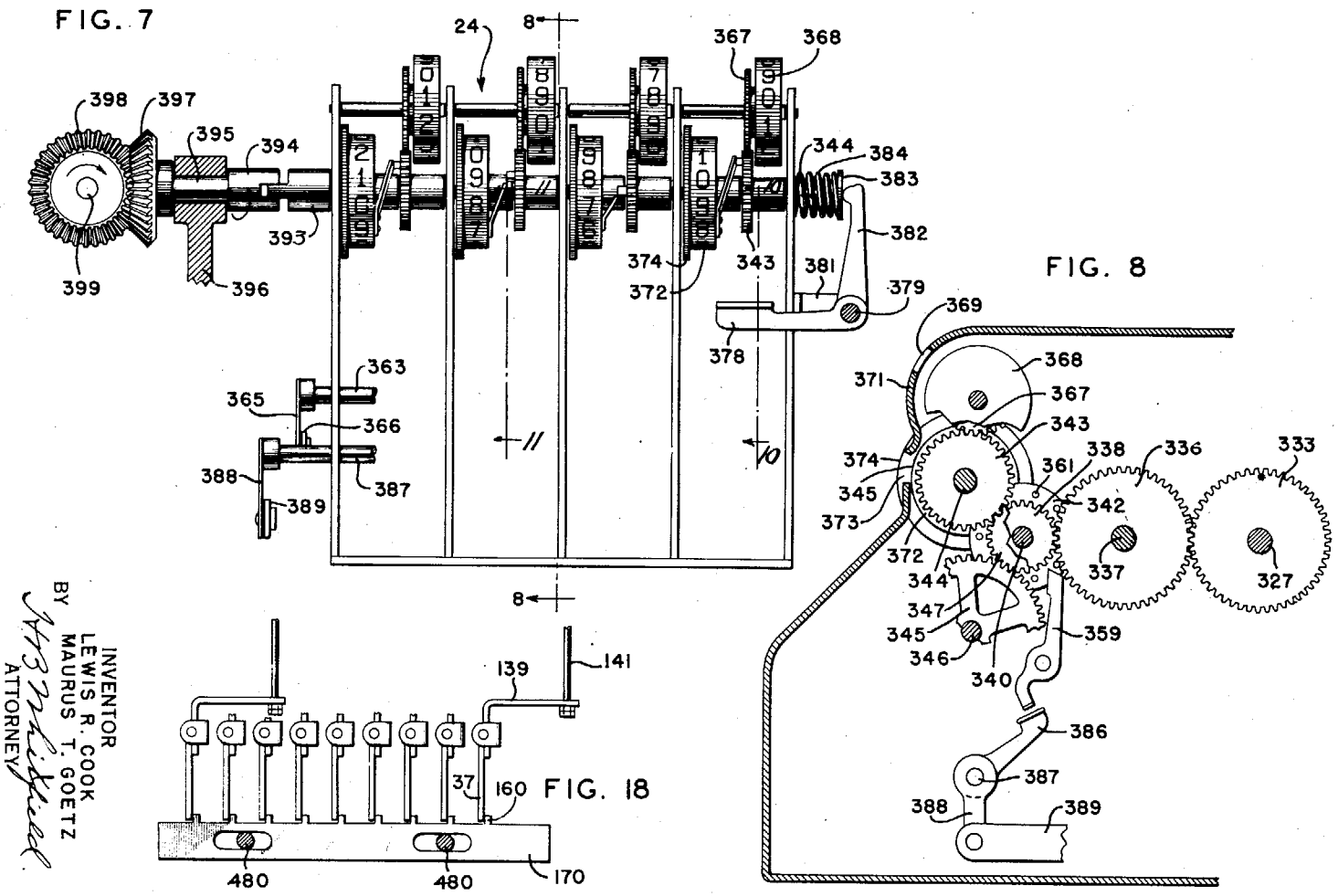
INVENTOR
LEWIS R. COOK
MAURUS T. GOETZ
BY H. B. Whitfield
ATTORNEY KEYBOARD PERFORATOR AND COUNTER
Original Filed Nov. 20, 1936 6 Sheets-Sheet 5
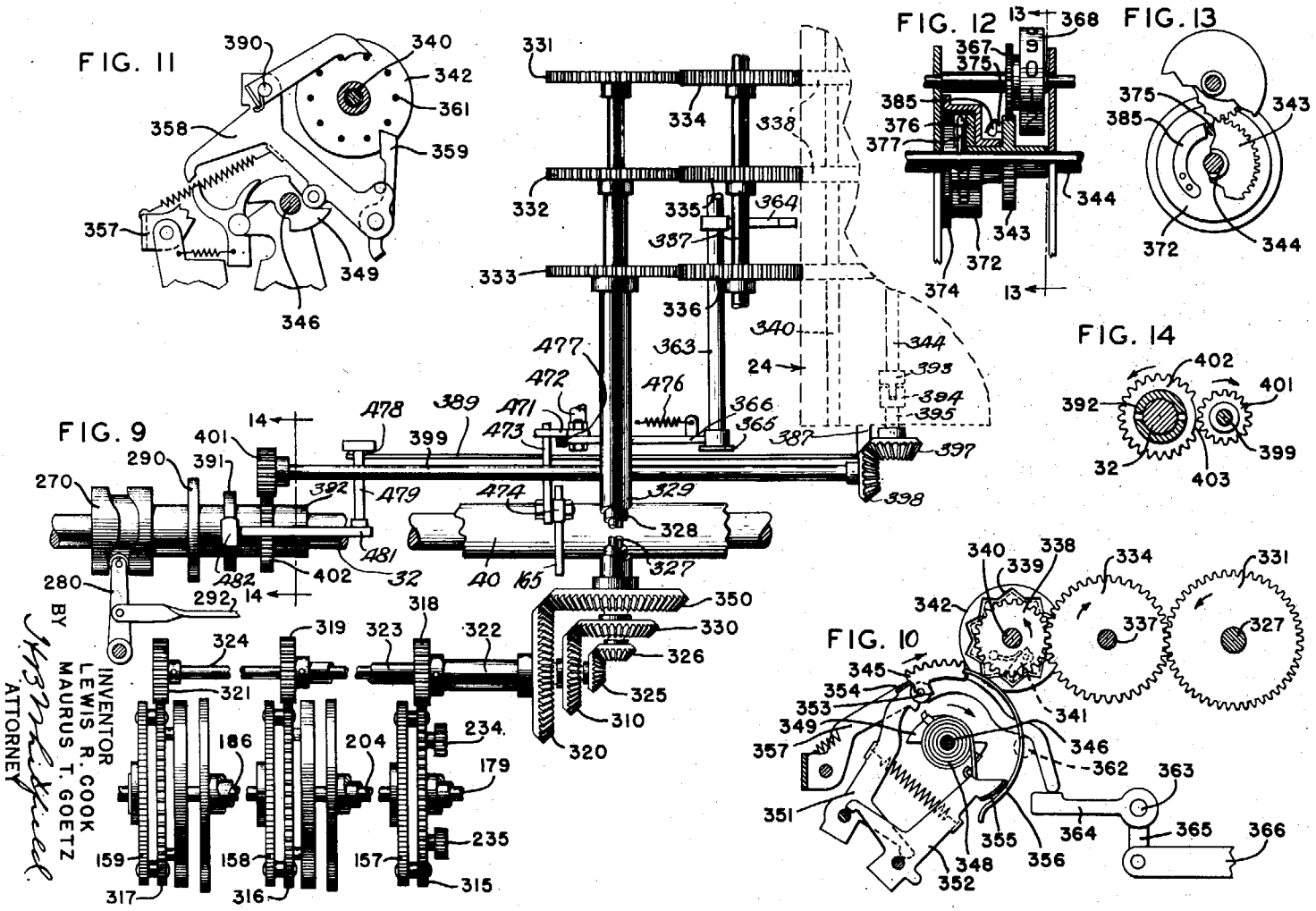
INVENTOR
LEWIS R. COOK
MAURUS T. GOETZ
BY H. B. Whitfield
ATTORNEY

KEYBOARD PERFORATOR AND COUNTER

Original Filed Nov. 20, 1936 6 Sheets-Sheet 6

INVENTOR
LEWIS R. COOK
MAURUS T. GOETZ
BY J. B. Whitfield
ATTORNEY

Reissued July 20, 1943

Re. 22,350

UNITED STATES PATENT OFFICE 22,350

KEYBOARD PERFORATOR AND COUNTER

Lewis R. Cook and Maurus T. Goetz, Chicago, Ill., assignors, by mesne assignments, to Teletypesetter Corporation, a corporation of Delaware Original No. 2,179,493, dated November 14, 1939, Serial No. 111,795, November 20, 1936. Application for reissue January 16, 1943, Serial No. 472,632

74 Claims. (Cl. 164—112)

The present invention relates to composing systems and apparatus therefor and particularly to machines for preparing a form for the automatic control of line composing and casting machines.

The principal object of the present invention is to provide a simple, reliable, and efficient apparatus for apprising an operator during the preparation of a control form for the automatic control of composing machines, of the totalization of actual and exact dimensions of the matrices to be composed in line of composition.

According to the exact-matrix-size method of measurement of the present invention, it is possible to measure matrix thicknesses in increments of .001" from .000" to .999", by employing a decimal method of counting character widths. Thus with complete accuracy, any existing matrix capable of being selected from a line casting machine magazine can be measured.

According to a feature of the present invention, full control of matrices from a plurality of magazines, for example, upper and lower main magazines and upper and lower side magazines of a mixer line casting machine may be effected with the same high degree of accuracy.

To achieve the above and other objects of the invention, a keyboard perforator and counter is provided with a removably interchangeable keyboard. The keys of the keyboard are superimposed upon a corresponding series of keylevers which perform a dual function of controlling a permutation selector mechanism of a perforating mechanism, and which, through suitable linkage, are arranged to control counting code bar elements contained in removable code bar units. The elements of each code bar unit are arranged to control three sets of counting vanes representative of the tenths, hundredths, and thousandths decimal positions. The counting vanes control, in turn, three counting ratchets, one for each of the tenths, hundredths, and thousandths decimal positions; the three ratchets being so interconnected with ratchet mechanism and planetary gearing as to function as a differential accumulator. Movements of the counting ratchets occur simultaneously in response to the operation of a keylever, through the instrumentality of a selector mechanism comprising the afore-mentioned counting vanes and the removable and interchangeable code bar units. Each movement of the ratchet is accumulated so that the combined movement of the three ratchet mechanisms is imparted to a matrix pointer in a manner similar to that disclosed in Patent No. 2,059,250 granted November 3, 1936, to H. L. Krum which, briefly, consists of a pointer mechanism movable across a fan-shaped or sectoral dial to indicate to the operator the totalizations of the thicknesses of the matrices in the line of composition being prepared on the perforated tape.

A feature of the present invention consists in adapting the keyboard perforator and counter for use in that form of typographical composition that is predicated on the unit system of matrix grouping for composing tabular matter, which requires that the operator be informed at all times whether or not the remaining unfilled portion of the column measure is an even multiple of ens; or expressed in a different way, whether or not the exact length of the unfilled portion of the line, measured in units (assuming that an 18-unit system is employed, in accordance with which an em represents 18 units of measurement and an en represents 9 units), is a multiple of nine units. If the remaining portion is not a multiple of ens, the units indicator provided according to the present invention will automatically indicate to the operator the number of units which must be added or subtracted to make the unfilled portion of the line a multiple of nine units or ens. The unit indicator is used in conjunction with the matrix pointer already provided for exact measurement of matrices, to provide the precise indication required for tabular composition, and comprises a dial which is rotated in one direction by means of gearing meshed with a gear attached to the tenths ratchet of the differential accumulator, and a pointer movable in the opposite direction by means of gearing meshed with a gear attached to the hundredths ratchet of the differential accumulator. In this connection, the ratchet of the thousandths decimal position is not operated, due to the fact that it is not contemplated that the number of units assigned to an "em" in any unit system will exceed ninety-nine. Heretofore the em quad has been divided into as many as thirty-two units. However, the scope or range of the application of the unit indicator of the present invention is limited only by the extent to which two ratchet mechanisms may be operated; that is, ninety-nine units. The relative positions of the dial and pointer at all times indicates to the operator the number of units to add or subtract from the remaining composition of the line to make the line fit a predetermined column or tabular width. The unit indicator may also be employed for preparing straight matter (as distinguished from tabular matter) in which event the operator composing the matter has, by the use of the unit indicator, access to a rapid means for measuring character widths to an accuracy of one unit.

A further feature of the perforator and counter according to the present invention resides in the provision of a thousandths indicator to inform the operator, by means of dial indication, as well as pointer indication, at any point within the line, the exact difference in thousandths of an inch between the column measure and the cumulative set-wise thickness of the assembled matrices and minimum space band thickness, or the exact cumulative set-wise thicknesses of the assembled matrices and minimum space band thicknesses. Since the thousands indicator supplements but does not replace the matrix pointer of the three-pointer indicator method disclosed in the cited patent granted to H. L. Krum, it is required that the differential accumulator provided in the principal structure, and the thousandths indicator (designed as an attachment) be capable of simultaneous operation under control of the three counting ratchets. The thousandths indicator provides dial accumulation of actual matrix sizes expressed in decimals and gives to the operator, for use in cases of marginal justification, a more accurate reading than is possible with the pointer type of indicator.

A more comprehensive understanding of the present invention may be had from the following description taken in conjunction with the accompanying drawings, wherein like reference characters represent similar parts throughout the several views.

In the drawings,

Fig. 7 is a front elevational view, with cover removed, of the dial reset mechanism of the thousandths indicator;

Fig. 8 is a cross-sectional view taken substantially on line 8—8 of Fig. 7;

Fig. 9 is a partial top view showing the application of the thousandths indicator to the differential accumulator;

Fig. 10 is a cross-sectional view taken approximately on the line 10—10 of Fig. 7;

Fig. 11 is a cross-sectional view taken approximately on the line 11—11 of Fig. 7;

Fig. 12 is an elevational view partly in section, illustrating the dial reset mechanism;

Fig. 13 is a sectional view taken on line 13—13 of Fig. 12;

Fig. 14 is a sectional view taken on line 14—14 of Fig. 9;

Fig. 18 is a view of the adjustable stop means for the counting vanes.

Figure 1:
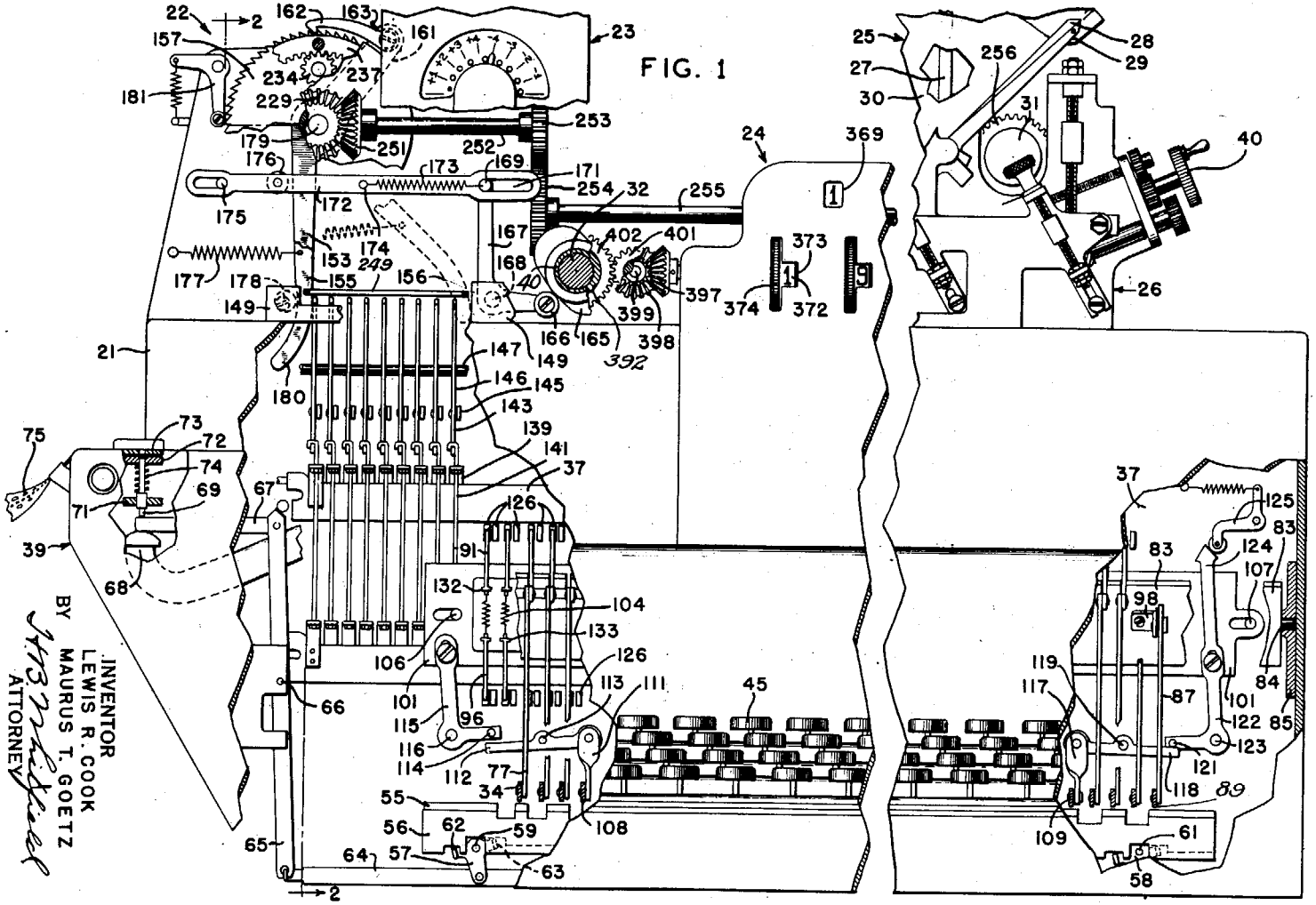
Fig. 1 is a front elevational view of a perforator and counter with parts broken away, showing the apparatus necessary for a clear understanding of the present invention.
Figure 2:
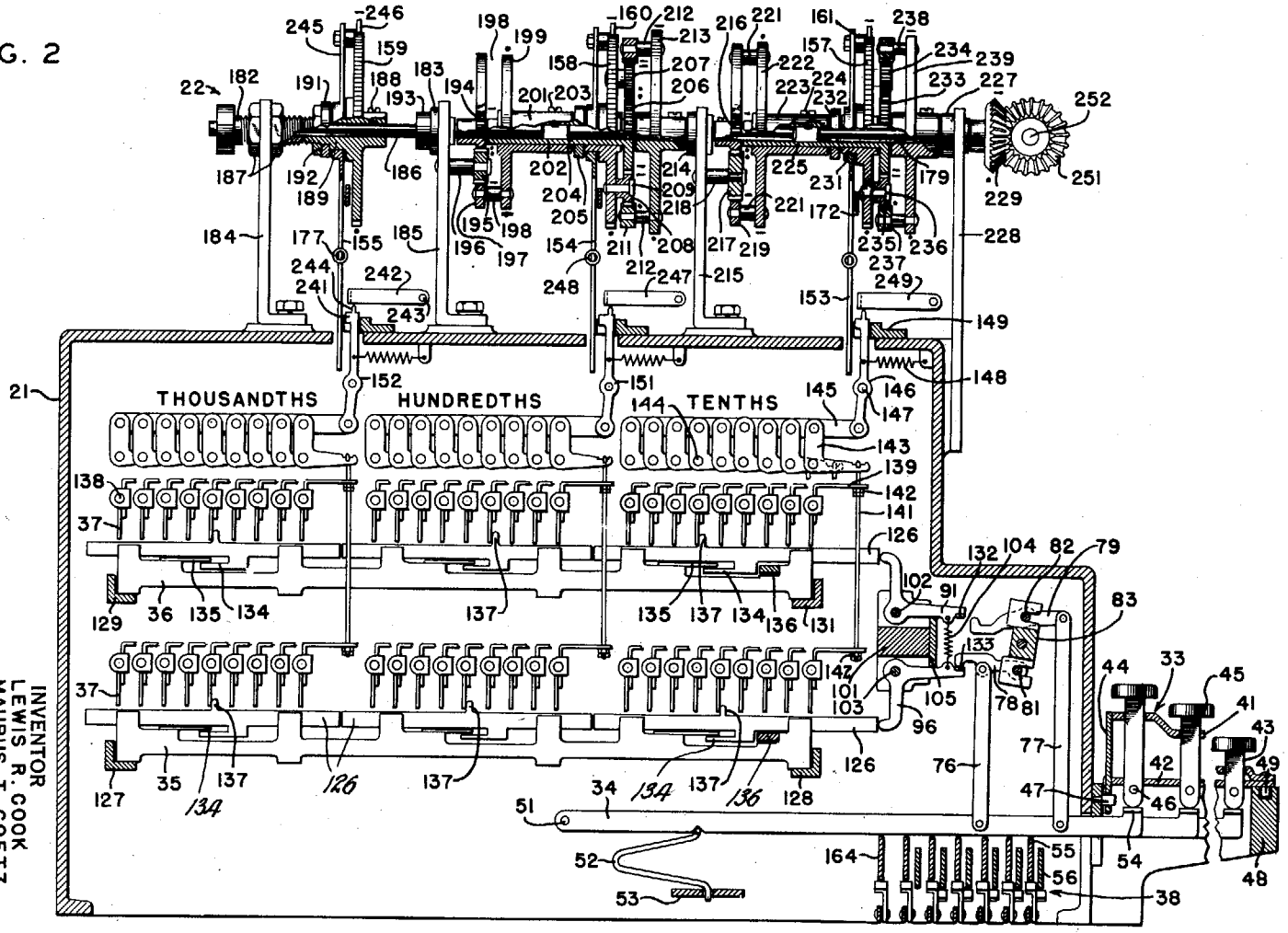
Fig. 2 is a cross-sectional view taken substantially on line 2—2 of Fig. 1.

Referring to Figs. 1 and 2, the apparatus comprises a base 21 which supports a differential accumulator assembly, a unit indicator, a thousandths indicator, a three-pointer indicator, and space band adjusting mechanism indicated generally as 22, 23, 24, 25, and 26, respectively. The three-pointer indicator 25 is of the type disclosed in Patent No. 2,083,570 granted June 15, 1937, to E. S. Larson and comprises a fan-shaped dial 30, a matrix pointer 27, and a pair of space band pointers 28 and 29. Briefly, movement is imparted to the matrix pointer 27 through the counting mechanism of the present invention and a friction clutch 31. As disclosed in Patent No. 2,083,570, the indicator dial 30 has adjacent its outer arcuate edge a scale or series of calibrations representative of a number of ems or picas in a line of maximum length, whichever unit is adopted as a unit of measure. The matrix pointer 27 moves along this edge of the dial from left to right, towards a zero indication in response to the totalization of the matrix thicknesses by the counting mechanism including the differential accumulator 22. Thus the distance from the pointer 27 to zero indicates the amount of space left in the line to be filled with matrices, when the line contains no space bands. However, when space bands are inserted in the line, the space remaining to be filled varies with the number of space bands inserted. So, to indicate the justifiability of the composed line, a pair of space band pointers 28 and 29 are provided, the distance between the pointers 28 and 29 indicating the amount of expansibility of the space bands. Since the distance from any operated position of pointer 29 to its zero or initial position represents the sum of the thin edges of all the space bands (whether one or more) in the line, and the distance from pointer 28 to the same initial or zero position represents the sum of the thickest ends of the space bands, it is manifest that the distance between the pointers 28 and 29 represents the difference between these sums, which is the amount of expansion, or expansibility, of the space bands contained in the line. Therefore, the space left in the line to be filled when space bands are inserted, is represented by the distance between the matrix pointer 27 and any point between space band pointers 28 and 29. The differential or proportional movements of pointers 28 and 29 toward the left, as viewed in Fig. 1 (from the zero position), is fully set forth in Patent No. 2,083,608 granted June 15, 1937, to E. S. Larson, which also discloses in detail the space band adjusting mechanism 26 whereby the movements of the space band pointers 28 and 29 may be varied or adjusted for different types and sizes of space bands.

The base 21, besides supporting the aforementioned mechanism, also supports at its front end a removable keytop assembly, indicated generally at 33 (Fig. 2), and houses a series of keylevers 34, a plurality of code bar units or counting magazines 35 and 36, a plurality of groups of counting vanes 37, and a permutation selector mechanism, indicated generally at 38, for controlling the operation of a perforator, indicated generally at 39 (Fig. 1).

The removable keytop assembly 33 comprises a top plate 41 and a bottom plate 42 which are slotted to receive a plurality of key rods 43.

Plates 41 and 42 are riveted together at the right (Fig. 2) and are fastened at the rear to a vertical plate 44. Key rods 43 have keytops 45 and are prevented from being removed from the keytop assembly 33 by individual pins 46. The keytops 45 may, of course, be readily removable and replaceable as individual keytops, if desired. The keytop assembly 33 is carried at the rear on studs 47 adapted to engage slots in rear plate 44, and at the front on cross bar 48 of the base 21. The studs 47 and 49 are provided to align properly the keytop assembly 33 with the plurality of keylevers 34. Keylevers 34 are pivoted on a common pivot rod 51 and are normally held in a horizontal position by individual springs 52 compressed between the keylevers 34 and a spring retaining bar 53. Each of the forward ends of the keylevers 34 has laterally disposed portions 54 to coact with its associated key rod 43.

The keylevers 34 extend over a plurality of pairs of code bars 55 and 56 included in the perforator selecting unit 38. The bars 55 and 56 of each pair are supported (Fig. 1) by a pair of T-shaped rocker arms 57 and 58 mounted on pivot rods 59 and 61 and having oppositely offset lugs 62 and 63 which uphold the code bars 55 and 56, respectively, of the corresponding pair of code bars. The rocker arms 57 and 58 of each pair of code bars are pivoted to and reciprocate a permutation bar 64 which is articulated to one of a series of levers 65, pivoted on a common pivot rod 66 carried in the perforating unit 39. To the upper end of each lever 65 is pivoted a punch interponent 67 removably interposed between a punch hammer 68 and one of a corresponding series of punch elements 69. Punch elements 69 are carried in a punch assembly comprising guide plates 71 and 72 and die plate 73, each punch element 69 being surrounded by a helical stripper spring 74. A tape 75 passes between the plates 72 and 73. Punch hammer 68 is pivotally carried in the base 21 and is arranged to be operated by a cam on a main operating cam sleeve 40 carried by the main shaft 32 in a manner described in Patent No. 2,059,250.

To effect the selective operation of interponents 67, each keylever 34 is arranged to depress one of the code bars 55 or 56 of each pair of code bars, and through the medium of rocker arms 57 and 58, lifts the other code bars either to advance or retract a corresponding permutation bar 64 to impart corresponding movement to the associated pivoted levers 65. The permutation bars 64 are set in characteristic combinations, and for this purpose the code bars 55 and 56 are provided with notched upper edges, the bars of each pair being complements; that is, the high portions of one pair are opposite the low portions of the other bar of the same general pair. It is also noted that the permutation bars have no normal position and are moved back and forth by the keylevers.

Figure 3:
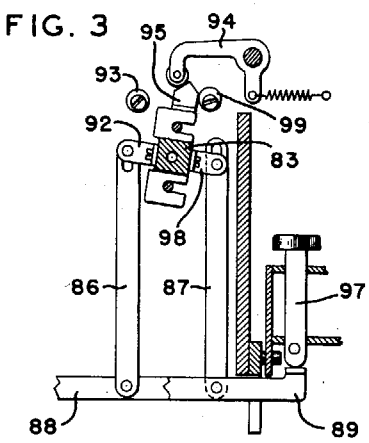
Fig. 3 is a fragmental sectional view illustrating the magazine shift mechanism.

Each of the keylevers 34 has pivoted thereto and extending vertically therefrom (Fig. 2), a pair of links 76 and 77 which are connected at their upper ends to levers 78 and 79, respectively. Levers 78 and 79 are rockably carried on rods 81 and 82, respectively, mounted in a magazine shift member 83 pivotally mounted at each end through a pair of trunnions 84 (Fig. 1) journaled in a bearing plate 85 secured to the base portion 21. The magazine shift member 83 is rockable to its counterclockwise and clockwise positions, respectively, by links 86 and 87 (Fig. 3) connected to the upper and lower magazine keylevers 88 and 89, respectively. When it is desired to rock the magazine shift member 83 to its counterclockwise position to bring levers 79 into position to operate the bell cranks 91 (Fig. 2) of the upper magazine counting mechanism, keylever 88 is depressed, thereby operating link 86 which, through bracket 92 secured to member 83, imparts counterclockwise rotation to member 83 (Figs. 2 and 3), to rock the magazine shift member 83 to its counterclockwise position, whereat it is held against an adjustable eccentric screw 93 by the action of a spring actuated jockey lever 94 on a detent 95 affixed to member 83. Again, when it is desired to rock the magazine shift member 83 back to its right-hand or clockwise position to bring levers 78 into cooperative relation with the bell cranks 96 associated with the lower magazine selector mechanism, the lower magazine key rod 97 is depressed to cause the lower magazine keylever 89 to be operated, which will, in turn, cause link 87 to be drawn downwardly to impart, through bracket 98, clockwise movement to member 83 to rock member 83 against an eccentric adjusting screw 99 where it will be held by the jockey lever 94 acting on detent 95.

Bell cranks 91 and 96 (Fig. 2) are individual to a lever 79 and 78, respectively, and are carried in a case shift member 101, the levers 91 being pivotally carried on a common pivot rod 102 and the levers 96 being pivotally carried on a common pivot rod 103. Each pair of bell crank levers 91 and 96 are biased attrahently by a common spring 104 which tends to hold the horizontal arms of the bell cranks 91 and 96 against a common stop bar 105. As shown in Fig. 1, case shift member 101 is slidably mounted on pins 106 and 107 carried in the base 21, and may assume either of two alternate positions under control of the shift keylever 108 and unshift keylever 109. When the shift keylever 108 is depressed by the actuation of its associated key rod it imparts, through a link 111, clockwise rotation to a lever 112 pivoted at 113 in base 21. Lever 112, through a stud 114, rocks bell crank lever 115 pivoted at 116 counterclockwise, bringing lever 115 to its position shown in Fig. 1 which, through its articulation with case shift member 101, causes member 101 to be shifted to its leftward position. Upon actuation of keylever 109 by its associated key rod, counterclockwise rotation is imparted through a link 117 to a lever 118 pivoted at 119 to impart, in turn, through stud 121, clockwise rotation to a lever 122 pivoted at 123. Lever 122 is articulated to case shift member 101 and is provided with an extension 124 terminating in a detent to cooperate with a spring actuated detent member 125. The clockwise rotation of lever 122 about pivot 123, as previously described, will impart rightward movement to case shift member 101 upon its pins 106 and 107. Member 101 is retained in its rightward or leftward position by the detent member 125.

Bell crank levers 91 and 96 (Fig. 2) are arranged to act upon counting elements 126 carried in counting magazines 35 and 36. Counting magazine 35 is slidable on guide rails 127 and 128 and counting magazine 36 is slidable on guide rails 129 and 131, so as to render counting magazines 35 and 36 removably interchangeable in base 21, in accordance with the font of type or magazine for which the perforated tape is to be prepared and in a manner disclosed in copending application Serial No. 582,742, filed December 23, 1931, by L. M. Potts and Patent No. 2,080,424, granted May 18, 1937, to E. S. Larson et al. The counting magazines are provided with slots to receive the counting elements 126, which are spaced at substantially one-half the keylever spacing (Fig. 1), so that two sets of three counting elements can be provided for each keylever, the case shift member 101, as previously mentioned, being shiftable to bring bell crank levers 91 and 96 into operative alignment with one or the other of the sets of counting elements of each pair of sets allotted to each keylever. To compensate for shifting of bell cranks 91 and 96, the latter are provided at the free ends of their horizontal arms with broadened surfaces 132 and 133 respectively. In this manner, levers 79 and 78 will be operative on their respective bell cranks 91 and 96 irrespective of the position of the case shift member 101.

Each counting element 126 is, in the present embodiment, one of a set of three elements corresponding to the tenths, hundredths, and thousandths decimal positions. Of course, counting elements 126 may be made in one piece, but it has been found that making them in separate parts facilitates manufacture. Each of the counting elements 126 is provided with a projection 134 arranged to be positionable under a retaining plate 135. When the three elements 126 forming one complete set of counting elements are installed, a locking bar 136 is inserted and the elements 126 are thereby locked in position so that they cannot fall out of the counting magazine during handling or installation. To effect their removal, the locking bar 136 is removed and the elements 126 are shifted toward the right whereupon they may be lifted out. Each one of the counting elements 126 has a vertical projection 137 corresponding to its value in each decimal position.

Arranged above each counting magazine 35 and 36 are three groups of counting vanes, each group comprising nine vanes representative of each of the digital positions 0 to 8, the digital positions being counted from the right toward the left as viewed in Fig. 2, the right-hand vane in each group representing zero (0). The counting vanes 37 extend across the entire width of the apparatus transversely of the keylevers and counting elements 126, the ends thereof having the conformation shown in Fig. 1, whereby each end has a laterally disposed portion 138 (Fig. 2) having journaled pivotal studs. In this manner the vanes 37 depend from their pivots and are swingable by the vertical projections 137 on the counting elements 126. Each of the vanes 37 has secured thereto near its left-hand end (Fig. 1), a right-angled bracket 139. The brackets 139 are arranged in stepped or diagonal manner across each group of nine vanes, the forward or leftmost bracket, as viewed in Fig. 1, being secured to the forward or zero vane 37 in each group. The horizontal arm of each of the brackets 139 (Fig. 2) is provided near its extremity with an aperture through which passes a vertical connecting rod 141 which carries adjacent the horizontal arm of each bracket 139 an adjustable nut 142 with its associated lock nut. When a vane 37 is rotated clockwise by a projection 137 upon leftward movement of a counting element 126, rod 141 will be actuated downwardly. Although a single rod 141 is associated with a bracket 139 and vane 37 in each vertical group of vanes, nevertheless, through the interconnection shown, the operation of one vane in a vertical group will affect the rod 141 independently of the other vanes and brackets in the vertical group.

The upper end of each rod 141 is articulated to the horizontal arm of a bell crank lever 143. Bell cranks 143 are interconnected by individual links 145 between their vertical arms and the respective depending arms of a series of stop bars 146 mounted on pivot rod 147. The stop bars 146 are biased in a clockwise direction to their unoperated position by individual springs 148 against the bottom of the notches of a guide comb 149 fixed to base 21. This action of spring 148 serves, through link 145, to hold bell crank 143 in its counterclockwise position, and thereby, through rod 141 and brackets 139, to maintain the vanes 37 in their counterclockwise position against the wards or projections 160 on an adjustable stop bar 170 (as shown in Fig. 18) to return the counting elements 126 to their rightward position. The stop bar 170 is adjustably mounted by clamp screws 480 (shown in section) and is provided for the purpose of obtaining an accurately located fixed back stop for each vane 37. A corresponding series of stop bars 151 and 152 is provided for the hundredths and thousandths decimal positions, respectively. Thus, a series of nine stop bars is associated with each group of nine counting vanes.

From the foregoing description, a key rod 43 acts through keylever 34 to move links 76 and 77 downwardly, which movement is imparted through levers 78 or 79 to bell cranks 91 or 96, depending upon which of the levers 78 or 79 is in cooperative engagement with its respective bell crank lever 91 or 96 as determined by the clockwise or counter-clockwise position of the magazine shift member 83. Since both links 76 and 77 associated with a keylever 34 are operated simultaneously, levers 78 and 79 are similarly operated, but if the member 83 is in the position shown in Fig. 2, lever 78 only will be operative upon its associated bell crank lever 96 to impart clockwise rotation to lever 96, which, in turn, causes the counting elements 126 associated therewith to be moved leftwardly. The latter movement of counting elements 126 will, through their vertical projections 137, actuate one vane 37 in each group of vanes to impart downward movement to the rod 141 operatively associated with the actuated vane, and to rotate in turn, through bell crank 143 and link 145, stop bar 146, 151, or 152 corresponding thereto, counterclockwise against the action of its retractile spring into the path of a ratchet feed lever 153, 154 and/or 155.

*Counting ratchet feed mechanism*

A counting ratchet feed mechanism is provided for each of the three counting positions; that is, a counting ratchet is provided for the thousandths position, a second counting ratchet with its associated differential unit is provided for the hundredths position, and a third counting ratchet with its associated differential unit is provided for the tenths position. Each counting ratchet may be variably fed from one to nine teeth under the control of the nine stop bars 146, 151, or 152 of each group which are selectably moved under the control of the key rods 43 into the path of the counting ratchet feed lever by the operation of the vanes 37, as previously described. It will be seen, in Fig. 1, that there is an individual stop bar for each digit from "0" to "8" inclusive, but that there is no stop bar for digit "9," since this position of the feed lever 153, 154, or 155 is controlled by a fixed stop 156 which forms a part of the guide casting 149. Accordingly, there is no stop bar and no controlling vane 37 provided for a "9" selection.

In the present embodiment, the ratchet feed levers 153, 154, and 155 are pivotally mounted on the hubs of their respective counting ratchet wheels 157, 158, and 159. Each of the ratchet feed levers has a vertically extending arm 161 (Fig. 1) at the extremity of which is carried a pawl member 162 biased by a spring 163 into engagement with the peripheral teeth of its associated counting ratchet wheel. Simultaneously with the selection of a stop bar 146, 151, or 152, as previously described, by the operation of a keylever 34, the keylever 34 operates a universal bar 164 (Fig. 2) which, in a manner similar to that disclosed in Patent No. 2,059,250, trips a clutch which initiates the rotation of the main operating cam sleeve 40 carried by the main shaft 32 and driven therefrom through one cycle of operation for each tripping of the clutch by power transmitted to shaft 32 by a motor (not shown). In operating a key lever it is not necessary to hold the key depressed throughout a cycle of operation, because immediately after the clutch is tripped, the operator may release the key.

The main operating cam sleeve 40 mounted on main shaft 32 carries cams for operating the counting ratchet feed mechanisms, a cam 165 (Fig. 1) being provided for each of the three decimal groups. Cams 165 have two similar cam contours such that for each one-half revolution of the cam sleeve 40, which is driven by a half revolution clutch, a cycle of operation is completed. That is, to register a matrix width on the dial 25 only one key operation or depression is required in response to which the cam sleeve 40 is driven through one-half revolution of the half revolution clutch. Coacting with cam 165 is a follower roller 166 carried at the extremity of the horizontal arm of a bell crank lever 167 pivoted at 168 to guide bracket 149. Fixed to the extremity of the vertical arm of lever 167 is a stud 169 adapted to operate in a slot 171 in a slide member 172. As cam 165 rotates one-half revolution, bell crank 167 is oscillated and motion is communicated therefrom to slide 172 through a spring 173 tensioned between stud 169 and a pin 174 on slide 172. Spring 173 thus provides a yielding interconnection between slide 172 and bell crank lever 167. The left end of slide 172 also has a slot by which slide 172 is carried on a stud 175.

Carried on slide 172 intermediate pin 174 and stud 175 is a roller 176 arranged to coact with the ratchet feed lever 153 (or 154 or 155). When a stop bar 146 is selected upon the actuation of a key rod 43 and the rotation of cam 165 is initiated, bell crank lever 167, during the first portion of the cycle of cam 165, is rotated clockwise, and communicates to slide 172 through spring 173 a motion to bring roller 176 into engagement with ratchet feed lever 153, whereby lever 153 is rotated counterclockwise to carry its depending arm toward the right against the action of retractile spring 177 until the cam surface at the lower end of lever 153 strikes the selected stop bar 146. Further motion of slide 172 by lever 167 is prevented, but through the yielding connection therebetween; namely, spring 173, stud 169 moves in slot 171, thus tending to stretch spring 173. As ratchet feed lever 153 is rotated in a counterclockwise direction, pawl 162 (Fig. 1) rides over a number of teeth on ratchet 157 corresponding to the angular distance through which lever 153 is permitted to move by the selected stop bar; that is, pawl 162 moves a distance of one tooth for each spatial distance between stop bars 146.

During the final portion of the cycle of cam 165, spring 177 becomes effective to return ratchet feed lever 153 to its clockwise or leftward position against eccentric adjusting screw 178 carried on bracket 149. Spring 177 also, through lever 153 and roller 176, tends to return slide 172 and (through spring 173) lever 167 to their normal leftward position shown in Fig. 1. If ratchet feed pawl 153 is permitted to move a distance representative of nine units, cam surface 180 thereon will strike against fixed stop 156, and lever 153 will thereby assume the dotted line position shown in Fig. 1. As ratchet feed lever 153 is thus returned by spring 177 in a clockwise direction against its stop 178, pawl 162 becomes effective to rotate ratchet 157 in a clockwise direction, which is imparted to shaft 179 as will hereinafter appear. A spring actuated detent lever 181 holds ratchet 157 against backslipping. Summarizing then, upon a single depression of a key lever 34, the clutch is tripped to initiate rotation of sleeve 40, and hence cam 165, which after rotating the first ninety degrees will cause pawl 162 to ride over a number of teeth to pick up that tooth corresponding to the stop 146 selected; then upon completing the second and final ninety degrees the cam 165 will permit springs 177 to return pawls 162 to their clockwise position to impart, through the differential accumulator mechanism rotation to shaft 255, and hence incremental movement to pointer 27 without depressing key lever 34 a second time.

It will be observed that stop bars 146 and 151 and 152 are evenly spaced in a straight line arrangement and that the cam surfaces 180 on the lower end of ratchet feed levers 153, 154, and 155 are so designed that this even spacing of the stop bars can be translated into even angular steps in the motion of the ratchet feed levers. Accordingly, the contour of cam surface 180 is a particular feature of the counting ratchet feed mechanism, since it enables evenly distributed stop bars to impart evenly spaced increments of angular motion to ratchet feed lever 153 (or 154 or 155).

*Differential accumulator mechanism*

Mounted on base 21 is the differential accumulator mechanism 22, which is controlled by the three counting ratchet feed mechanisms including the ratchet feed levers 153, 154, and 155, and their associated ratchet wheels 157, 158, and 159, respectively. As shown, there is a counting ratchet feed mechanism associated with each of the groups of counting vanes and stop bars controlled thereby for counting in the tenths, hundredths, and thousandths decimal positions. It is understood that stop bars 146, 151, and/or 152 are selected simultaneously to effect the simultaneous operation of the counting ratchet feed mechanisms, but for purposes of simplifying the description, these operations will be described separately beginning with the thousandths ratchet feed mechanism, followed by the hundredths and finally the tenths counting mechanisms. Rotation of the thousandths ratchet 159 is suitably combined with rotation of the hundredths ratchet 158, by means of the differential mechanism associated with the hundredths ratchet 158. The resulting motion is then combined with the motion produced by the tenths ratchet 157, by means of a differential mechanism associated with the tenths counting ratchet to produce a total angular rotation of shaft 179 which is exactly proportional to the decimal value of the matrix thickness being counted. In the present embodiment the gear ratios are so designed that shaft 179 will be moved .075° by the motion of one tooth on the thousandths ratchet 159, .75° by the motion of one tooth on the hundredths ratchet 158, and 7.5° by the motion of one tooth on the tenths ratchet 157. If all three ratchets are fed simultaneously one tooth, the resulting angular motion will be the sum of the three aforementioned angular motions or 8.325°. The decimal relation between the three ratchet mechanisms is corollary to the use of a decimal counting system. The direction of gear rotation is indicated in Fig. 2 in a conventional manner by a dot and dash system; that is, a dot indicates motion toward the observer, and a dash indicates motion away from the observer.

Journaled in bushings 182 and 183 carried in brackets 184 and 185, respectively, is a shaft 186. Bushing 182 is clamped to bracket 184 by lock nuts 187. The aforementioned ratchet wheel 159 associated with the thousandths counting ratchet feed mechanism is fixed to shaft 186 through set screw 188, and carried on the hub portion 189 of ratchet wheel 159 is the ratchet feed lever 155. The rotation of ratchet 159 as imparted to it by ratchet feed lever 155 is such that the lower portion approaches the observer as indicated conventionally by a dot. The ratchet feed lever 155 is held on hub 189 by a washer 191 which, in turn, is held against the shoulder of hub 189 by a nut 192 fitted on the threaded portion of said hub. Axial movement of shaft 186 is prevented by the abutment of hub 189 against bushing 182 and a collar 193 fixed to shaft 186 adjacent bushing 183.

Fixed to shaft 186 adjacent bracket 185 and to the right thereof (as viewed in Fig. 2), is a gear 194 which is arranged to mesh with an idler gear 195 carried on a stud 196 secured to bracket 185. Idler gear 195 in turn meshes with an internal gear 197 carried on studs 198 affixed to a disc 199 integral with a sleeve 201. Sleeve 201 is fixedly carried on a further sleeve 202 by means of a screw 203. Sleeve 202 is carried at its left-hand end on an extension of shaft 186, which thus forms a bearing for one end of said sleeve, the other end of which is carried on a leftward extending portion of a shaft 204. The hundredths counting ratchet 158 is carried on sleeve 202 adjacent sleeve 201, a washer 205 being interposed between the hub portion of ratchet 158 and the sleeve 201 to hold ratchet feed lever 154 on said hub portion. In this manner, ratchet 158 is loosely mounted for rotation on sleeve 202 and ratchet feed lever 154 is, in turn, loosely mounted for rotation on the hub of ratchet 158.

Sleeve 202 terminates at its rightward end in a gear 206 which meshes with a pair of planetary gears 207 and 208 carried on ratchet wheel 158 by studs 209. Planetary gears 207 and 208, in turn, mesh with an internal gear 211 carried by studs 212 on a disc 213 affixed through its hub portion to shaft 204. Shaft 204 is journaled in a bushing 214 carried in a bracket 215 mounted on the base 21. Shaft 204 extends rightwardly from bracket 215 and has affixed thereon adjacent bushing 214 a gear 216 which meshes with an idler gear 217 carried on a stud 218 affixed to bracket 215. Idler gear 217, in turn, meshes with an internal gear 219 supported by studs 221 on a disc 222 integral with a sleeve 223. Sleeve 223 is mounted on and secured to, by means of a screw 224, a sleeve 225 carried at its left end on the rightwardly extending portion of shaft 204. The right end of sleeve 225 is carried on a shaft 179 journaled in a bushing 227 in a bracket 228 mounted on the base 21. To the right end of shaft 179 adjacent bracket 228 is fixed a beveled gear 229. The counting ratchet wheel 157 is loosely mounted on sleeve 225 and has a hub portion 231 on which is supported the ratchet feed lever 153. Lever 153 is held on hub 231 by a washer 232 interposed between sleeve 223 and hub 231. Sleeve 225 terminates at its right end in a gear portion 233 which meshes with a pair of planetary gears 234 and 235 carried on ratchet wheel 157 by studs 236. Planetary gears 234 and 235, in turn, mesh with an internal gear 237 held by means of studs 238 on a disc 239 which is affixed through its integral hub portion to shaft 179.

In counting a three-digit matrix thickness, one of the stop bars 152 in the thousandths counting position is moved into the path of ratchet feed lever 155 so that the ratchet feed lever will be arrested by engagement of cam shaped end 180 of the ratchet feed lever with stopping surface 241 of the selected stop bar 152. Locking bail 242 pivoted at 243 is held clear of projections 244 of stop bars 152 by a cam (not shown) carried by the main operating cam sleeve mounted on main shaft 32. Other locking bails 247 and 249 are similarly supported adjacent to stop bars 151 and 146, respectively. When rotation of the main operating cam sleeve is initiated by operation of universal bail 164, locking bails 242, 247, and 249 are lowered by their operating cams into blocking relation to stop lever projections 244, with the projections of unoperated stop bars 146, 151, and 152 disposed at the right of the locking blades of bails 249, 247, and 241, respectively, and the projections of operated stop bars disposed at the left thereof, as viewed in Fig. 2. Near the end of a cycle of operation of the cam sleeve, bails 242, 247, and 249 are lifted to their ineffective positions by their operating cams. The upper extension 245 of ratchet feed lever 155 carries feed pawl 246 which, upon oscillation of lever 155, imparts rotation to ratchet 159 which, in turn, imparts like angular rotation to shaft 186 and hence to gear 194. Gear 194, through idler gear 195, rotates disc 199 in the opposite direction, and hence through sleeve 202, rotation is transmitted to gear 206 similar to disc 199. Through planetary gears 207 and 208, gear 206 rotates internal gear 211 and disc 213 in a direction opposite to the direction of rotation of gear 206. Such rotation of disc 213 causes like rotation of shaft 204. Simultaneously with the operation just described, one of the stop bars 151 in the hundredths counting position has also been selected and has been maintained in its operated position by locking bail 247 in a manner similar to bail 242. Correspondingly, ratchet feed lever 154 oscillates until its cam end 180 strikes the selected stop lever 151, and on its being retracted by its spring 248 (similar to spring 177, Fig. 1), rotational motion is given to ratchet 158 in a direction indicated by the conventional sign, which is similar to that imparted to ratchet 159 and, through the differential gearing between ratchet 159 and disc 213, to said disc 213. Accordingly, the motion of ratchet 158 is added to the motion already communicated to disc 213 and hence the combined motions are imparted, through disc 213, to shaft 204. In other words, the rotation transmitted to shaft 204 is the combined rotation governed by the thousandths and hundredths counting mechanisms.

This combined rotation communicated to shaft 204, is, in turn, transmitted to gear 216, and through idler 217 to internal gear 219, and hence disc 222. The direction of rotation imparted to disc 222 is opposite to that given to shaft 204. The rotation of disc 222 is transferred through sleeve 225 to gear 233, which rotation is imparted through planetary gears 234 and 235 to internal gear 237, and hence disc 239, giving to disc 239 a rotation in a direction opposite to that imparted to disc 222. This rotation of disc 239 is communicated to shaft 179. Thus, as so far described, the rotation of shaft 179 is proportional to the combined rotations of ratchets 158 and 159.

In the same manner as previously described for the thousandths and hundredths operations, a stop bar 146 has been simultaneously selected and maintained in its operated position by a lock bail 249. The ensuing operation of ratchet feed lever 153 governed by the particular stop bar 146 selected, imparts a rotation to ratchet wheel 157 similar to that given to ratchet wheels 158 and 159 over an extent determined by the stop bar selected. This rotation is the same as that already communicated to disc 239 just described, and hence through planetary gears 234 and 235, additional rotation in the same direction is imparted to disc 239 in such a manner as to superadd the rotation of ratchet 157 to that of disc 239, which combined rotation is transmitted to shaft 179. Thus, the rotation of the tenths ratchet 157 is combined with the rotations of the hundredths ratchet 158 and the thousandths ratchet 159 to produce a totalized rotation of gear 229.

As previously described, beveled gear 229 moves varying angular distances according to the particular key operated. Each angular distance is directly proportional to the decimal value of the matrix thickness being counted. Rotation of beveled gear 229 is communicated to a beveled gear 251 meshed therewith and fixed to a shaft 252 appropriately journaled in brackets (not shown) mounted on the base 21. As shown in Fig. 1, shaft 252 carries on its right end a spur gear 253 which meshes with a spur gear 254 fixed to a shaft 255 also suitably journaled in brackets (not shown) mounted on the base 21. A worm (not shown) is affixed to the right-hand end of shaft 255, in a manner clearly set forth in Patent No. 2,059,250, which worm meshes with a worm wheel 256 associated with the counting clutch 31, thus completing a gear train between the differential accumulator mechanism 22 and counting clutch 31.

The foregoing description relates to a keyboard perforator and counter which is capable of counting exact thicknesses of matrices contained in a line of composed matrices measured to the thousandths of an inch. However, the device so far described is not limited to the exact-matrix-size method of totalization, but may readily be employed for counting any unit font with complete accuracy, on a unit basis. Instead of arranging the counting elements 126 of counting magazines or code bar units 35 or 36 in such a manner as to govern the differential accumulator 22 according to the tenths, hundredths, and thousandths decimal positions, the counting elements 126 may be arranged to govern only the tenths and hundredths ratchet mechanisms, the thousandths position being controlled only by "0" counting elements. With this arrangement, it is apparent that the differential accumulator 22 will act to count units from one to ninety-nine. However, it is customary, in employing the unit system of counting, to divide an em space or quad on a basis of eighteen units and to assign each matrix of a font to a certain one of eighteen groups. Due to the fact that unit counts from one to ninety-nine may readily be obtained, the device according to the present invention thus extends the scope of counting operations possible by the device disclosed in U. S. Patent No. 2,043,231, granted June 9, 1936, to S. Bracken et al. The latter device is capable of counting units from five to thirty-two units.

*Unit indicator*

The capability of the device just described to totalize matrices according to the unit system lends itself readily for use in connection with the composition of tabular matter. Accordingly, there is disclosed in Figs. 4, 5, and 6, an embodiment of the present invention consisting of the unit indicator 23 which may be employed in conjunction with the matrix pointer 27 to provide the precise indication required for tabular composition. As is the practice in composition based on the unit system wherein an em in any type face or font is counted as eighteen units, this counting value results in a scale indication of one keyboard em; hence, when the unit indicator is employed, the pica indication on the main pointer unit 25 can be converted into "ems" either by changing scales or by operation of the adjustment indicated generally as 40 (Fig. 1) disclosed in Patent No. 2,083,570. Use of the unit indicator 23 for tabular composition assumes that any thickness assigned to the space band, within its operating range, will be counted in the same manner as matrices; that is, by counting code elements 126. For tabular work using the unit indicator, pointers 28 and 29 are not employed, and to prevent their motion, the structure indicated generally as 26, is rendered ineffective.

Figure 6:
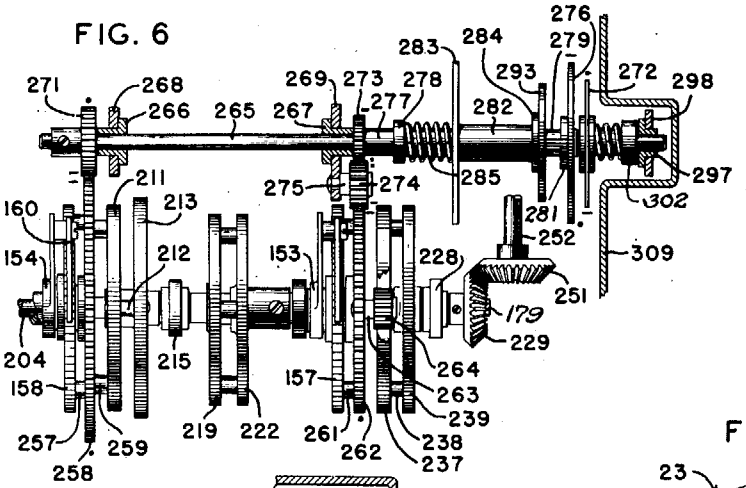
Fig. 6 is a partial top view of the differential accumulator illustrating the application of the unit indicator thereto.

To adapt the unit indicator 23 to the principal structure of the keyboard perforator and counter of the present invention, an additional gear is supplied to the tenths and hundredths ratchet mechanisms to control the operation of gears carried on the unit indicator shaft 265, as shown in Fig. 6. In Fig. 1 is shown a fragmental portion of the unit indicator 23 to indicate its relative position with respect to the differential accumulator 22 when the unit indicator is employed. In referring to the modification of the differential accumulator shown in Fig. 6, the same reference characters will be employed to designate similar parts that are shown in Fig. 2. The differential accumulator shaft 204 associated with the hundredths ratchet mechanism is shown as carrying the ratchet wheel 158, on the hub of which is mounted the ratchet feed lever 154, carrying pawl 160. Fixed to ratchet wheel 158 on studs 257 is a gear 258 which carries on studs 259 a pair of planetary gears (not shown) comparable to the planetary gears 207 and 208, shown in Fig. 2 which, in turn, mesh with internal gear 211 carried on studs 212 by disc 213. Shaft 204 is journaled in bracket 215, as described in the principal embodiment, and extends rightwardly to form a support for internal gear 219 and disc 222. Ratchet wheel 157 in the tenths position is shown in the same relative location as in Fig. 2, and carries the ratchet feed lever 153 mounted on its hub. To ratchet wheel 157 is fixed, by means of studs 261, a gear 262 which carries on studs 263 a pair of planetary gears 264 comparable to gears 234 and 235 shown in Fig. 2. The latter gears mesh with internal gear 237, which is carried on stud 238 by disc 239. To the right end of shaft 179, journaled in bracket 228, is the beveled gear 229 which meshes with the beveled gear 251 fixed to shaft 252, which, through the gear train disclosed in Fig. 1, transmits the combined actuations of the tenths and hundredths positions of the differential accumulator to matrix pointer 27 which, as previously mentioned, moves across a keyboard em scale to indicate to the operator the amount of space left in a line of composition, in a manner well known in the prior art and exemplified by the above mentioned patent.

Figure 5:
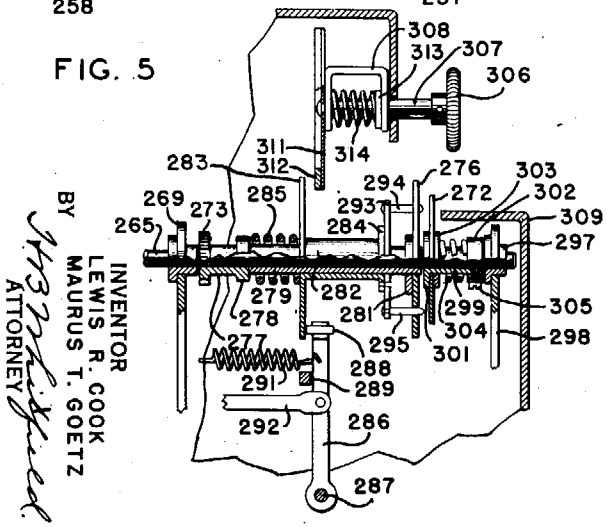
Fig. 5 is a fragmental sectional view taken on line 5—5 of Fig. 4.

The unit indicator 23, according to the modified form of the invention, comprises the aforementioned shaft 265 journaled in bushings 266 and 267, in brackets 268 and 269, respectively, mounted on base 21. To the left end of shaft 265 is fixed a gear 271 which meshes with gear 258 which has been added to the hundredths ratchet mechanism for the purpose of controlling pointer 272 of the unit indicator. Loosely mounted on shaft 265 adjacent bushing 267 is a gear 273 which meshes with an idler gear 274 carried on stud 275 affixed to bracket 269. Idler gear 274, in turn, meshes with the gear 262 added to the tenths ratchet mechanism for controlling the movement of dial 276 of the unit indicator. Gear 273 is integral with a sleeve 277 which, as shown in Figs. 5 and 6, has a flange 278. Also carried on shaft 265 and having a slot and key connection with sleeve 277 is a sleeve 279. Integral with sleeve 279 adjacent the right end thereof (Fig. 5), is a flange 281 to which dial 276 is riveted.

Slidable on sleeve 279 is a sleeve 282 having integral therewith a disc portion 283 and a flange portion 284. Between the disc portion 283 and flange 278 is a helical compression spring 285. Spring 285 normally tends to urge sleeve 282 rightwardly but is restrained therefrom by a lever 286 (Fig. 5), pivoted at 287, which carries at its extremity a roller 288 coacting with disc 283. Lever 286 is normally held against a stop 289 by a spring 291 which is sufficiently strong to overcome the helical compression spring 285. Pivotally connected to lever 286 is a link 292 which cooperates with a cam 270 carried on the reset or matrix pointer return sleeve 392 (Fig. 9) carried at the rear of the main shaft 32, and which functions upon the operation of the pointer return key to actuate, through lever arm 280, lever 286 (Fig. 5) rightwardly for a purpose which will presently appear. To flange 284 is riveted a disc 293 carrying a pair of diametrically disposed pins 294 and 295, so located that they engage and partially extend through one pair of nine pairs of holes 296 (Fig. 4) in the dial 276.

The right end of shaft 265 is journaled in a bushing 297 carried in bracket 298, and positioned between bushing 297 and the right end of sleeve 279 is a sleeve member 299 having an integral flange 301 at one end, and fixed to the other end of sleeve 299 is a collar 302. Sleeve 299 carries the pointer 272 which is arranged between flange 301 and a disc 303. Pointer 272 is frictionally held between flange 301 and disc 303 by a helical compression spring 304. Sleeve 299 is fixed to shaft 265 by a set screw 305, which also serves to attach collar 302 to sleeve 299. Thus it is observed, from Fig. 5, that pointer 272 is rotatable with shaft 265 through the medium of sleeve 299, and that dial 276 is rotatable with sleeve 279.

Figure 4:
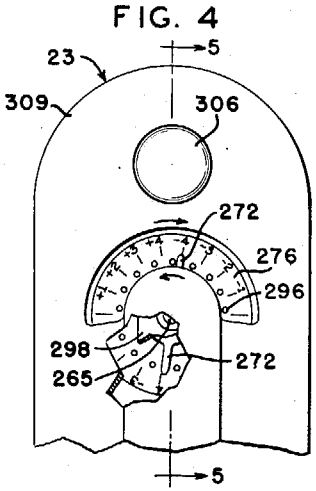
Fig. 4 is a partial front elevational view of the unit indicator.

A quick and simple manual method for engaging pins 294 and 295 with the holes 296 in alignment with the unit value to which the pointer must be restored during the pointer return operation, as will hereinafter appear, is also provided as shown in Figs. 4 and 5. This feature comprises a knurled knob 306 fixed to a shaft 307 which is slidably and rotatably mounted on a U-shaped bearing 308 secured to the cover 309 of the unit indicator. Riveted to the end of shaft 307 is a disc 311 equipped with a friction facing 312. Also carried on shaft 307 and disposed between the left-hand bearing of the U-shaped bearing 308 and a collar 313 affixed to shaft 307 is a helical compression spring 314. In this manner, shaft 307 is normally held in its rightward position by the action of spring 314 upon collar 313. When it is desired to engage pins 294 and 295 with a certain desired pair of holes 296 in dial 276, the shaft 307 is, by means of knurled knob 306, urged leftwardly until the facing 312 engages the disc 283, and further movement of shaft 307 toward the left will carry sleeve 282 leftwardly to remove pins 294 and 295 from holes 296. When in this position, the knurled knob 306 may be turned to bring pins 294 and 295, through the instrumentality of the frictional engagement between facing 312 and disc 283, into position to engage a new pair of holes 296 as determined by the desired stop or zero position of the pointer 272.

From the foregoing, it is observed that the operations of the tenths and hundredths ratchet mechanisms of the differential accumulator not only govern the rotation of shaft 252 and hence the movement of matrix pointer 27, but also, through gears 258 and 262, control the rotation of pointer 272 and dial 276 in opposite directions. The purpose of moving the dial and pointer in opposite directions is to convert a decimal system into an eighteen-unit system.

The object of a unit indicator is to advise the operator, at any time within the composition of the line, whether or not the remaining unfilled portion of the column measure is an even multiple of ens (which is equivalent to one-half em or nine units), or, expressed in a different way, whether or not the exact length of the unfilled portion of the line, measured in units, is a multiple of nine units. When the pointer 272 is opposite a "0" graduation on dial 276, a condition obtains wherein the unfilled portion of the line is a multiple of nine units, which condition is known in the typographical art as being "on the wheel". If the pointer indication is "+1" the operator is then advised that the composition is "one unit off the wheel (add), and to get "on the wheel" it is necessary to add one unit, which would be accomplished by using a ten unit space or leader instead of the usual nine or eighteen unit space or leader the next time one is required in the line. Similarly, "+2", "+3", and "+4" advise the operator to add two, three, or four units, respectively, in order to get "on the wheel".

If the pointer 272 indicates "−1" the operator is thereby advised that the composition is "one unit off the wheel (subtract)", and to get "on the wheel" it is necessary to subtract one unit, which could be accomplished by using an eight-unit space or leader instead of the usual nine unit, or eighteen unit space or leader the next time one is required. Similarly, "−2", "−3", and "−4" advise the operator to subtract two, three, or four units, respectively, in order to get "on the wheel".

It will be noted that the dial moves only when the tenths ratchet is operated, and then it moves in a direction opposite to that of the pointer. This, as previously indicated, is necessary in order to convert a decimal system, based on multiples of ten, to an eighteen-unit system, based on multiples of nine. Thus, starting from a zero position of the pointer with respect to the dial, the nine-unit count is accomplished by the hundredths ratchet 158 advancing nine teeth and thus through gear 258 rotating the pointer 272 counterclockwise (as viewed in Fig. 4) through an angular distance of 180°, while the tenths ratchet 157 is unoperated so that the dial remains stationary, resulting in a motion of the pointer, relative to the dial, of 180°, or another zero reading.

Starting from a zero position of the pointer 272 with respect to the dial 276, an eighteen-unit count is accomplished by the hundredths ratchet 158 advancing eight teeth, and thus rotating the pointer 272 counterclockwise through an angular distance of 160°, while the tenths ratchet 157 is advancing one tooth to rotate the dial 276 clockwise through an angular distance of 20° resulting in a net motion of the pointer, relative to the dial, of 180°, or another zero reading. In the same manner it may be shown that for any multiple of nine units up to and including ninety-nine units, the net angular motion of the pointer relative to the dial, is 180°.

A counting value which is not a multiple of nine units, for instance seventeen units, will now be considered. Starting from a zero position of the pointer with respect to the dial, a seventeen-unit count (as well as 26, 35, 44, 53, 62, 71, 80, 89, and 98) would result in the pointer 272 being moved, by the actuation of ratchet 158 through an angular distance of seven teeth, counterclockwise through an angular distance of 140°, while the dial would be moved clockwise, by the operation of ratchet 157 one tooth, through an angular distance of 20°, resulting in a net motion of the pointer 272, relative to the dial 276, of 160°, or a dial reading of +1, which is indicative of the fact that the composition is "one unit off the wheel (add)", which is as expected (since one unit must be added to get "on the wheel"). Similarly, starting from zero, a nineteen-unit counting value (as well as 28, 37, 46, 55, 64, 73, 82 or 91 unit counting values) would result in a net angular motion of the pointer, relative to the dial, of 200°, or a dial reading of −1, which is indicative of the fact that the composition is "one unit off the wheel (subtract)". For a ten-unit count or a one-unit count, the −1 reading would be effected by a 20° relative angular movement between dial 276 and pointer 272. During this operation, the pointer 272 remains stationary, motion being imparted only to the dial.

At the end of each line, the "return" key is actuated in the usual manner, and the unit indicator is returned to its zero position automatically in the following manner:

Dial 276 is provided with holes 296, one for each graduation, and two stop pins 294 and 295 pass through two diametrically opposite holes 296 from the rear of the dial. As previously described, the two stop pins are mounted on a stop disc 293 to the rear of and concentric with the dial 276. When in normal position for counting character widths, these stop pins 294 and 295 extend through the holes 296 in the dial 276, but not far enough to interfere with the motion of the pointer 272. The stop disc 293 and pins 294 and 295 are held in this normal position against the compression of spring 285 by the "return" lever 286 which is held against a fixed stop 289 by a spring 291.

Upon actuation of the "return" key, the "return" lever 286 is pushed forward (toward the right as viewed in Fig. 5) against the tension of spring 291 by the cam 270, thus permitting the stop disc 293 to be moved forward by the compression spring 285, moving the stop pins 294 and 295 into the path of the pointer 272; the timing on the cam 270 being such that this action occurs before the pointer 272 can be moved by the counting mechanism or differential accumulator and continues in action at least until all parts are restored. Then, since the "return" key-lever has corresponding counting elements 126 associated with it for accomplishing a nine-unit indication in the removable counting magazine 35 or 36, the pointer friction discs 301 and 303 are moved an angular distance of nine dial divisions or 180° by the gear 258 attached to the hundredths ratchet 158, and the pointer 272 is moved only until it is stopped against the stop pins 294 and 295. In this condition, the unit indicator is in its zero position ready to start a new line.

If the unit indicator herein disclosed is applied to any other system of unit indication where the em has a value other than eighteen units, it would still be the practice to have the "return" key count nine units. However, for systems where the em has a unit count greater than eighteen units, it would be necessary to actuate the "return" key more than once at the end of each line. Thus, where one em equals eighteen units or less, it is only necessary to strike the "return" key (which controls a nine-unit movement) once at the end of each line. But where one em has a unit count more than eighteen units, up to and including thirty-six units, it is necessary to actuate the "return" key (nine units) twice at the end of each line; and three times for values over thirty-six units up to and including fifty-four units, etc. An alternative method which may be used with an em space of 36 units or less would be to equip the return key with a 99-unit count, and thus effect the proper resetting of the unit indicator by a single actuation of the return key.

Referring again to the condition where one em equals 18 units, a full column measure, as indicated by the position of matrix pointer 27 against its stop, as is disclosed in Patent No. 2,059,250, may not be an even multiple of nine units or ens, but may equal a certain number of ens plus a certain number (less than nine) of units. In such cases, the unit indicator would not start each line "on the wheel", with an initial reading of zero, but would start each line with a reading equal to −1, −2, −3, −4, +4, +3, +2, or +1 for an extra number of units of 1, 2, 3, 4, 5, 6, 7, or 8, respectively, over the last multiple of nine units. Therefore, when starting the line "on the wheel" the stop pins 294 and 295 should penetrate the stop holes 296 corresponding to the two zero graduations; but when starting the line "off the wheel" the stop pins 294 and 295 should penetrate the stop holes 296 corresponding to the correct "add" or "subtract" graduations according to the number of units by which the length of line exceeds an even multiple of nine units or ens.

*Thousandths indicator*

The three-pointer method of line measurement and justification, using the matrix pointer 27 and the space band pointers 28—29 (Fig. 1) as disclosed and described in Patent No. 2,059,250, has distinct advantages in that it is extremely simple, easily understood, and can be read and interpreted at a glance. Thus, with this method, all that the operator needs to know about justification is that all the lines of composition will justify and should be ended when the matrix pointer rests between the two space band pointers. It has been found desirable, in the preparation of certain types of composition, to supplement the three-pointer method of indication by a means for indicating to the operator exactly how much set-wise space remains in the line or column measure. When using unit matrices, this accuracy may be provided by the unit indicator previously described, but a unit indicator is not applicable when using non-unit matrices. Accordingly, the present invention provides a thousandths indicator, indicated generally as 24 (Fig. 1), which will supplement the three-pointer method of line measurement and justification and will inform the operator at any point within the line, as to the exact difference in thousandths of an inch between the column measure or length of line and the cumulative set-wise thickness of the assembled matrices and minimum thicknesses of space bands, by means of subtraction to zero from a setting equivalent to the number of thousandths of an inch in the column measure or length of line; or conversely, to inform the operator at any point within the line as to the exact cumulative set-wise thickness of the assembled matrices and minimum thicknesses of space bands by means of addition from a setting of zero up to any reading between zero and 9.999".

The apparatus shown in Figs. 1 and 2 and described above uses a decimal counting system. For general use, the pointer indication is desirable since it provides a continuous picture of the justification problem in the line being composed without requiring constant mathematical interpretation by the operator. Accordingly, it must be understood that the thousandths indicator (indicated generally as 24 in Fig. 1 and disclosed in detail in Figs. 7–13 inclusive) supplements but does not replace the matrix pointer 27. It is therefore provided that the differential accumulator embodied in the principal structure and the thousandths indicator 24, which is designed as an attachment, be capable of simultaneous operation under control of the three counting ratchets of the differential accumulator.

The thousandths indicator (Fig. 7) consists of a four-dial structure, in which the three dials of lower order are driven from gears secured to the tens, hundredths, and thousandths counting ratchets in the differential accumulator, and the fourth dial, which is driven only by the carryover mechanism of the dial of the next lower order, is used to permit accumulation to a maximum indication of 9.999". Associated with each dial in the thousandths indicator is a carryover wheel which functions when the dial passes through zero, to advance the dial of the next higher order by one unit. This carryover actuation is timed to follow the principal actuation of the column dials. The structure as will presently appear provides a linkage from the perforator main shaft to time properly this carryover operation. Mechanism is also provided to return automatically all dials to their zero position upon the operation of a "return" key after a particular totalization has been attained. The restarting operation is accomplished under control of a linkage from the return clutch of the perforator, through manual selection of the "return" key upon the perforator keyboard. Two methods of indication will be described, one in which the dials are restored to a zero reading at the end of each line in the conventional manner and indicate at any time, during composition of a line, the cumulative length of assembled matrices and minimum thicknesses of space bands, and a second embodiment in which the dials are reset to the decimal value of the column measure or length of line and operate subtractively during composition of a line to indicate at any time the amount of the column measure yet to be filled with matrices.

In Fig. 9 is shown a general top view (with certain parts omitted) of the thousandths indicator and its associated shafts and gears by means of which selective operation of the three counting ratchets of the differential accumulator is transmitted to the three corresponding sections of the thousandths indicator. Counting ratchets 157, 158, and 159 are, as previously described, a part of the differential accumulator mechanism of the principal structure disclosed in Fig. 2. Associated with ratchets 157, 158, and 159 (Fig. 9) and carried thereby on suitable studs are gears 315, 316, and 317, respectively. As in the case of the unit indicator, the planetary gears indicated in the principal structure as carried by the ratchets 157, 158, and 159 are for purposes of the presently described embodiment carried by gears 315, 316, and 317 and act through their associated internal gears to combine the incremental movements of the ratchets 157, 158, and 159 to impart to the matrix pointer 27, a movement which is a totalization of the movements of the various counting ratchet mechanisms of the differential accumulator. As described in the disclosure of the principal structure, each of the counting ratchets 157, 158, and 159 is selectively rotated in varying amounts from zero to nine teeth, and thus provides the same quality of motion as is normally provided by the manually operated column actuators of machines of the type shown in U. S. Patent No. 762,521 which employ thousandths indicators of the type herein disclosed. In order to utilize this motion, gear 317 is affixed to ratchet 159, gear 316 is affixed to ratchet 158, and gear 315 is affixed to ratchet 157. These gears engage gears 318, 319, and 321, respectively, and permit the motion of the ratchet mechanisms of the differential accumulator to be transmitted through two sets of nested shafts to the thousandths indicator 24, which is located as viewed in Fig. 1, to the left of the matrix pointer 27, and faces the operator, so that the dial indication is easily visible, and can be compared readily with the matrix pointer indication.

As indicated in Fig. 9, gear 317 on the thousandths ratchet 159 meshes with the gear 321 affixed to a shaft 324 which forms the center of the nested group of shafts 322, 323, and 324 appropriately journaled on brackets (not shown) mounted on the base 21. At the right end of shaft 324 as viewed in Fig. 9 is affixed a beveled gear 325 which meshes with a beveled gear 326 affixed to a shaft 327 which forms the center of a nested group of shafts 327, 328, and 329 also suitably carried on base 21. Affixed to nested shafts 322 and 323 are beveled gears 310 and 320, respectively, which mesh with beveled gears 330 and 350 affixed to shafts 328 and 329, respectively. To shaft 327 is affixed, adjacent the thousandths indicator 24, a spur gear 331. Likewise, to shafts 328 and 329 are affixed gears 332 and 333, respectively. To impart the desired direction of rotation to the elements of the thousandths indicator 24, idler gears 334, 335, and 336 are loosely carried on a shaft 337 arranged parallel to the nested shafts.

Figs. 10 and 11 illustrate well-known arrangements for controlling the operation of the dials of the thousandths indicator, and for a detailed description of this type of mechanism, reference may be had to U. S. Patent No. 762,521, dated June 14, 1904. Accordingly, for purposes of the present disclosure, this particular mechanism will be described only briefly. Having reference to Fig. 10, the thousandths driving gear 331 is shown meshed with idler gear 334 which, in turn, is meshed with a gear 338 carried on a shaft 340 which is part of the existing calculating machine structure embodied in the thousandths indicator of the present disclosure. Gear 338 is affixed to an internal ratchet 339 which is engaged by a spring-biased pawl 341 carried on a lantern wheel 342, Figs. 8, 10 and 11. Accordingly, counterclockwise motion of gear 331 results in counterclockwise motion of lantern wheel 342. As shown in Fig. 8, gear 347 affixed to wheel 342, meshes with a gear 343 carried on shaft 344, which permits of a more convenient location of the indicator dial 372 and makes it more readily visible to the operator. Figs. 10 and 11 are analogous to Figs. 2 and 3 of Patent No. 762,521 and are chosen because they show most clearly the carryover mechanism which forms an essential part of the calculating machines to which the patent relates and of the thousandths indicator which may be incorporated into the apparatus embodying the present invention.

Briefly, the carryover operation is as follows: The carryover wheel or gear 345 (Figs. 8 and 10) is mounted on shaft 346 and meshes with the gear 347 affixed to lantern wheel 342. Carryover wheel 345 rotates one-half revolution for every revolution of gear 347 and tensions a spring 348 which is constantly urging a cam 349, Figs. 10 and 11, in a clockwise direction. Cam 349, which is carried on shaft 346, is restrained from movement by escapement pawls 351 and 352 which become effective alternately under the control of a roller 353 (carried on carryover gear 345), cams 354 and 355, guard 356, and latch 357, as is fully set forth in Patent No. 762,521. The mechanism shown in Fig. 10 is associated with a dial of a lower order, whereas the mechanism shown in Fig. 11 is actuated by the mechanism shown in Fig. 10 but is associated with the lantern wheel of the next higher order or decimal position.

The carryover operation occurs in calculating machines when a dial moves from 9 to 0. Under this circumstance, roller 353 by coacting with cam 354 disengages pawl 351, as shown in Fig. 10, and allows spring 348 to rotate cam 349 one-half revolution until the stopping projection is arrested by pawl 352. During this revolution, cam 349 imparts a counterclockwise rotation to lever 358 (Fig. 11) about pivot 390, which carries at its right extremity a pawl 359. Due to the operation just described, pawl 359 rises, and engages a pin 361 on the lantern wheel 342, and imparts counterclockwise rotation to the lantern wheel 342 in the amount of one unit or angular step. However, in order that this carryover rotation may not be merged in the principal rotation imparted to the hundredths indicator by idler gear 335, latch 357 has been provided which restrains cam 349 from operating until after the principal rotation has been completed. In manually operating calculating machines employing thousandths indicators analogous to that disclosed by the present invention, the principal rotation is imparted to gear 338 by a manually operated column actuator, and latch 357 is disengaged by a pin carried by the column actuator at a point located substantially as indicated by dotted circle 362. To simulate this manual control of the carryover mechanism, the device of the present invention provides a shaft 363 which carries three identical arms 364, one associated with the hundredths lantern wheel 342, one associated with the tenths lantern wheel, and one associated with the units lantern wheel. Arms 364 are fixed to shaft 363, which also has fixed thereto an arm 365 pivotally connected to a link 366. As shown in Fig. 9, the left-hand end of link 366 is articulated to the vertically extending arm of a bell crank 471 rockably mounted upon stub shaft 472. The horizontally extending arm of the bell crank 471 is disposed above one end of a cam follower lever 473 which is mounted intermediate its ends upon a pivot pin (not shown) and has a follower roll 474 in engagement with one of the cams 165 carried by main operating cam sleeve 40. Link 366 is urged leftwardly, as viewed in Fig. 9, by a tension spring 476, and normally engages a fixed stop 477. Lever 473 is actuated according to the contour of cam 165, but engages bell crank 471 and rocks it through the required distance only as follower roll 474 rides cam portions of minimum radius. At other times, lever 473 rocks out of engagement with bell crank 471. Thus, although the contour of cam 165 imparts smooth and gentle motion to the follower lever 473, the effectiveness of the lever upon bell crank 471 is confined to a few degrees of rotation of cam 165, and at all other times, lever 473 undergoes idle motion out of engagement with bell crank 471. In this manner, shaft 363 is rotated under control of cam 165 (Fig. 1) carried on main shaft 32 and is so timed that latch arm 357 is rotated counterclockwise by means of its associated lever 364, under control of link 366 and cam 165 just following the conclusion of the ratchet feeding operation. It is the object of this structure to provide, under control of cam 165, a timed sequential operation of the dials, with the primary actuation under control of the counting ratchets of the differential accumulator, and the following carryover actuation under control of latch 357.

Having reference to Fig. 8, gear 331 is operated from the thousandths ratchet 159 and engages idler gear 334 which, in turn, engages gear 338 affixed to the internal ratchet 339 (Fig. 10). A gear 347 which is affixed to lantern wheel 342, drives carryover wheel 345 and also engages idler gear 343, which in turn communicates its rotation to gear 367 affixed to dial 368 and thereby imparts suitable rotation to dial 368. The numbers on the dial 368 are visible through a window 369 located in the cover 371, and the numbers on the reset dial 372 are visible through a window 373 located in cover 371. Reset dial or drum 372 is provided with a knurled flange 374 extending through slots in the cover 371 as more clearly shown in Fig. 1. Knurled flanges 374 are provided for use in manually setting dials 372 as will hereinafter appear.

A resetting structure carried on shaft 344 is provided in the thousandths indicator of the present invention for automatic resetting of the dials 368 to a predetermined and manually settable column measure indication, instead of to zero as is customary in existing calculating machines.

Having reference to Figs. 12 and 13, it is observed that dial 368 and its associated gear 367 are driven by idler gear 343 which is free to rotate on reset shaft 344. Gear 343 carries a stud or reset pin 375. Since gears 343 and 367 are continually in mesh, and as shown in Fig. 7, have the same number and pitch of teeth, it is evident that for each of the ten angular positions of dial 368, in which the digits are centered under window 369, gear 343 and pin 375 also have a corresponding angular position. On the peripheral surface of dial 372 are reference digits, by means of which the position of dial 372 is set. Dial 372 carries on its interior wall a radially slotted disc 376. Shaft 344 carries a pin 377 which normally engages one of the ten slots in disc 376. As will hereinafter appear, shaft 344 has a definite angular stop position, so that pin 377 always occupies a definite angular position when the shaft is in its stop position. When it is desired to change the relation between a resetting drum 372 and shaft 344, the shaft is moved leftwardly by the manual means shown in Fig. 7, which comprises a manual reset lever 378 affixed to a shaft 379 mounted in bracket 381. Also fixed to shaft 379 in alignment with shaft 344 is a vertical lever 382. Positioned between a disc 383 fixed to shaft 344 is a helical compression spring 384. Thus, when counterclockwise rotation is imparted to lever 378, similar rotation, through shaft 379, is imparted to lever 382 which will cause shaft 344 to be shifted toward the left, as viewed in Figs. 7 and 12, against the action of compression spring 384. This motion of shaft 344 will cause pin 377 to be moved out of engagement with the slots in disc 376, whereupon dial 372 is free to be rotated through the medium of knurled flange 374 to present any desired digital indication through the window 373 (Fig. 8). When each of the dials 372 has been set, for example as shown in Fig. 7, pressure is released from lever 378 to permit spring 384 to restore shaft 344 to its rightward position to bring pin 377 into engagement with a radial slot in disc 376.

As shown in Fig. 13, a reset spring 385 is riveted to the drum 372 and cooperates with pin 375 carried on gear 343. Shaft 344 makes one complete revolution during the resetting operation, in clockwise direction (Fig. 13). Accordingly, reset spring 385 will move from its initial position, which can manually be adjusted to any one of ten definite angular positions as previously described, through a complete revolution and will return to its starting position. During this revolution, reset spring 385 will pick up pin 375 in any angular position, and restore this gear to an initial angular position as determined by the manual setting of drum 372. This resetting operation moves the dials, carryover wheel 345, and the lantern wheels 342 in their normal direction of rotation, but the rotation is not transmitted back through the gears 334 and 331 and nested shafts to the counting ratchets of the differential accumulator, because the internal ratchet arrangement comprising ratchet 339 (Fig. 10) and pawl 341 between the lantern wheels 342 and gears 334 permits free rotation of the dials and lantern wheels during the reset operation. It is observed that during normal counting operation, the gears 343 can rotate in their normal direction without interference between pin 375 and spring 385, since the spring 385 readily yields to the left (Fig. 12) and permits passage of pin 375 thereover.

It is necessary, however, to prevent the carryover mechanism from operating during the resetting cycle, since there are certain settings in which this carryover operation would render the final position of the dials incorrect. Accordingly, as shown in Fig. 8, there is provided a lever 386 associated with each carryover feed pawl 359 (Figs. 8 and 11). Levers 386 are fixed to and actuated by a shaft 387 which has secured thereto a depending arm 388. Arm 388 is pivoted to a link 389 which is articulated at its opposite end to the lower arm 478 fixed to rock shaft 479. Rock shaft 479 also has secured thereto an arm 481 extending parallel to and above shaft 32. At its free end, arm 481 is provided with cam follower roll 482 which engages cam 391. When cam 391 moves follower roll outwardly radially of shaft 32, rock shaft 479 is rocked clockwise, and through arm 478 reciprocatory movement (leftward as viewed in Fig. 9, rightward as viewed in Fig. 8) is imparted to link 389. Levers 386 (Fig. 8) are thus rocked counterclockwise, and pawls 359 are disengaged from lantern wheels 342 during the carryover operation.

Fig. 7 shows a front view of the thousandths indicator 24 with the cover removed and with the reset drums 372 manually set to provide automatic return to a column or length of line indication of 1.980", which setting is accomplished as previously described through the operation of manual reset lever 378 and manual actuation of knurled flanges 374. It is noted that axial reciprocation of shaft 344 is rendered possible by means of the slot and key construction of a hub 393 and slotted hub 394. Hub 394 is affixed to a shaft 395 suitably journaled in bracket 396 and terminates in a beveled gear 397 which meshes with a beveled gear 398 carried on a shaft 399, which terminates, as indicated in Fig. 9, in a gear 401 affixed thereto. Gear 401 meshes with a gear 402 integral with reset sleeve 392. Accordingly, it is apparent that shaft 344 may reciprocate axially during the manual setting of reset dials 372 and still maintain its angular position as determined by gears 397 and 398 and the stop position of shaft 399. Referring again to Fig. 9, it will be noted that gear 401 is drven by gear 402 on the reset sleeve 392 which, in turn, is driven by a conventional grab clutch (not shown). As shown in Fig. 14, gear 402 is larger in diameter than gear 401 and has a portion of its teeth removed as shown at 403. Shaft 399 and its associated gear 401 are maintained in an accurate stop position by means of a detent (not shown).

When the return clutch is actuated by the "return" key on the keyboard, return sleeve 392 rotates in a counter-clockwise direction (as viewed in Fig. 14), and as soon as this rotation begins, cam 391, through suitable linkage, imparts rightward motion to link 389 (Fig. 8), thus rotating lever 386 about shaft 387 to move feed pawls 359 into a clockwise position where they will clear the pins 361 of the lantern wheels 342 during any carryover operation which may occur when a dial is reset through the zero position. This renders the carryover feed pawls 359 ineffective, but permits normal operation of carryover spring 348. Immediately thereafter, as return sleeve 392 continues its rotation, the teeth on gear 402 mesh with the teeth on gear 401. Gear 401 is thereby turned exactly one revolution and returns to its detented stop position before gear 402 has completed its rotation. As viewed in Fig. 7, it is seen that as shaft 399 is rotated clockwise, shaft 344, and hence dials 372, are rotated in such direction as to cause springs 385 to overtake and pick up pins 375, and since dials 372 make one complete revolution, it is evident that in whatever angular position the various pins 375 happen to be they will be picked up and returned by springs 385 to their predetermined return positions, for example, inasmuch as dials 372 in the present illustration are shown set for a column measure of 1.980", dials 368 will, during the return function just described, be picked up and returned to the same indication or column measure, which in the present example is 1.980". During the final period of movement of gear 402 within which interval gear 401 is at rest, cam 391 imparts leftward movement (as viewed in Fig. 8) to link 389 and permits carryover pawls 359 to return to their normal operative positions in which they may engage the pins 361 on lantern wheels 342 during normal carryover operations. Return sleeve 392 also carries a cam 290 (Fig. 9), which, upon the cyclic rotation of sleeve 392, controls through suitable linkage (not shown) the return of the matrix pointer 27 to its beginning of line position, in the manner disclosed in aforementioned Patent 2,083,570.

Referring to Fig. 1, the thousandths indicator 24 is shown with its cover in place, wherein the upper row of windows 369 are provided for indication of units, tenths, hundredths, and thousandths. At any time during the assembly of a line, the digits exhibited through these windows indicate the remainder of the column measure which must be filled with matrices. During the composition of the line, the resetting dials indicate the full column measure, and are visible to the operator through the lower row of windows 373.

It is obvious that the thousandths indicator can be used either additively or subtractively merely by changing the sequence and location of the numbers on the indicator dials 368 and the reset dials 372.

When employing the thousandths indicator, the right-hand space band pointer 29 would be rendered ineffective. Under this condition, the left-hand pointer deflection would be adjusted to indicate on the scale the net expansion provided by the space bands in the line, the minimum thickness of the space bands would then be counted by a suitable arrangement of counting elements positioned in the counting magazine and operated by the space band lever.

*Multiple counting magazine control*

Figure 16:
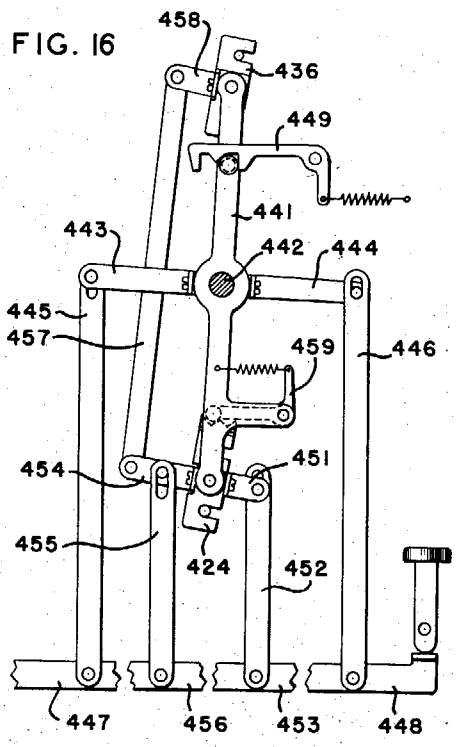
Fig. 16 is a linkage arrangement for controlling the shift positions of the modification shown in Fig. 15.
Figure 15:
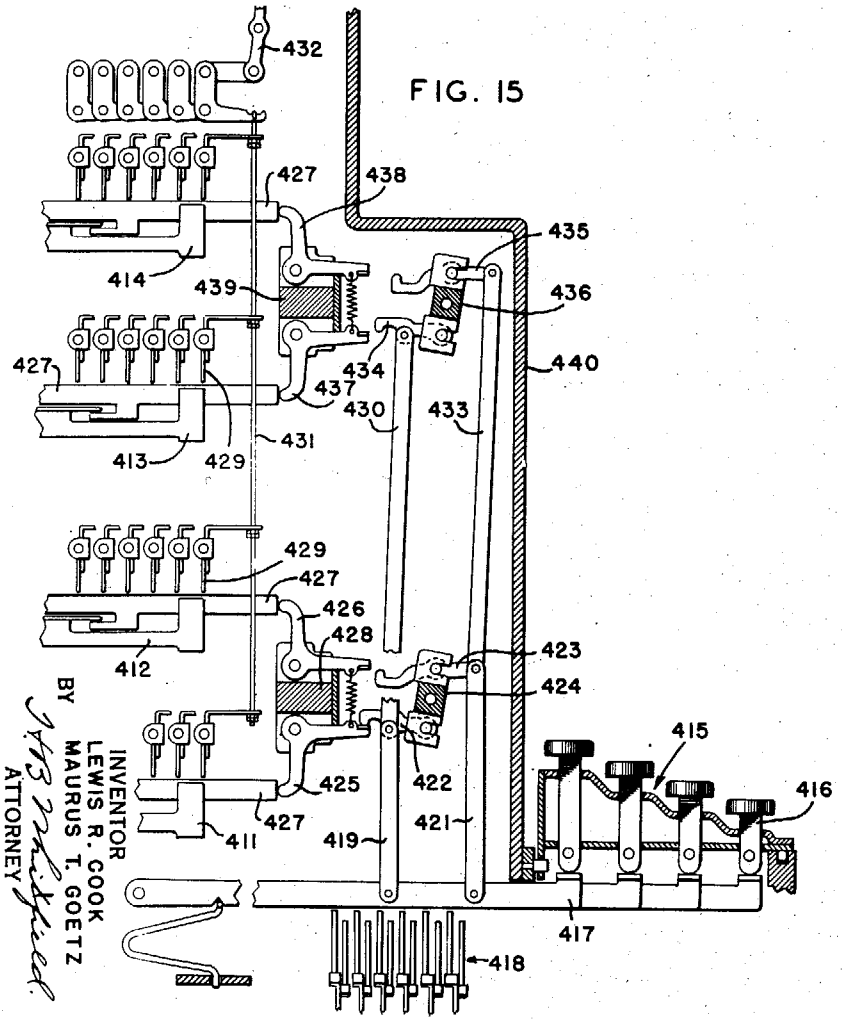
Fig. 15 is a partial cross-sectional view of a modification of the invention embracing a multiplicity of upper and lower magazines.

In Figs. 15 and 16 is disclosed a modification of the structure hereinbefore described embodying provision for a multiplicity of counting magazines. It is the purpose of this modification to provide a keyboard perforator and counter with four counting magazines 411, 412, 413, and 414 which is equivalent in arrangement and counting capacity to the four matrix storage magazines provided on commercial mixer line-casting machines. When equipped with this structure, the keyboard perforator and counter gives the operator facilities for perforating a single strip of tape which may be used to control the assembly of matrices from all four magazines of a commercial mixer linecasting machine. This modification of the principal structure operates under control of four key rods on the perforator keyboard to permit the operator to select any one of the four counting magazines and to render the selected magazine operative from the character keys on the keyboard to control the counting action of a single differential accumulator unit 22 (Fig. 2).

The four counting magazines 411, 412, 413, and 414, for purposes of this disclosure, are arranged in two pairs. The upper pair is assigned to the side or auxiliary magazines of the linecasting machine, and the lower pair is assigned to the main magazines. Operation of a character keylever is routed to one of the four magazines by means of the linkage shown in Fig. 15 and the control structure shown in Fig. 16. The key rod assembly 415 is analogous to the construction, location, and operation of keytop assembly 33 (Fig. 2) of the principal structure previously described. The key rods 416 act to operate keylevers 417 which, through a permutation selecting mechanism 418, control the perforation of the tape in a manner similar to selector mechanism 38 of the principal structure. To keylever 417 are pivotally connected vertical links 419 and 421 which are pivotally connected at their upper ends to levers 422 and 423, which are in turn pivotally carried in a magazine shift member 424. Levers 422 and 423 cooperate with bell cranks 425 and 426, respectively, to control the selection of counting elements 427, in a manner similar to that described in connection with the principal structure. Bell crank levers 425 and 426 are carried in a case shift member 428 which is shiftable longitudinally in a manner similar to that shown in Fig. 1 and previously described. A corresponding vane 429 in each of the four levels engages a single vertical connecting rod 431 to control the single associated stop member 432 comparable to that shown in Fig. 2. By this means, the differential accumulator may be controlled from any one of the four levels in which a counting element 427 may be operated.

Associated with links 419 and 421 and extending vertically therefrom, and pivoted to levers 422 and 423 are links 430 and 433, respectively, which are pivotally connected at their upper ends to levers 434 and 435, respectively, similar to levers 422 and 423. Levers 434 and 435 are pivotally carried in a magazine shift member 436, similar to member 424. Likewise, levers 434 and 435 are adapted to be operatively associated with bell crank levers 437 and 438, respectively, to operate, in turn, counting elements 427 of the upper group of counting magazines 413 and 414. Levers 437 and 438 are carried in case shift member 439 similar in construction and operation to member 428. Case shift members 428 and 439 may either be rigidly connected to shift to the left or right as a single unit under the influence of the shift and unshift keys, or it may be desirable to move the case shift members 428 and 439 individually under the control of separate individual keylevers or to disable their movement entirely.

As shown in Fig. 16, the upper and lower magazine shift members 424 and 436 are carried on the lower and upper arms, respectively, of a cradle member 441 which is pivotally mounted on a shaft 442 suitably mounted in the housing 440. Affixed to the hub of the cradle 441 are brackets 443 and 444 to the extremities of which are articulated the upper ends of links 445 and 446, respectively. Link 445 is pivoted to a keylever 447, and link 446 is pivoted to a keylever 448. Upon actuation of keylever 447, cradle 441 will, through link 445, be rocked to its counterclockwise position, bringing the upper magazine shift member 436 toward the bell cranks 437 and 438 to bring levers 434 or 435 into cooperative engagement therewith. By the same movement of cradle 441, the lower magazine shift member 424 is moved away from the bell crank levers 425 and 426, thus drawing levers 422 and 423 out of cooperative engagement with their respective bell crank levers. A spring actuated detent member 449 is provided to hold cradle 441 in one or the other of its operative positions. On the other hand, to return cradle 441 to the clockwise position shown in Fig. 16, keylever 448 is actuated, which will, through link 446 and bracket 444, impart clockwise rotation to cradle 441 whereat it will be retained by detent 449.

When magazine shift members 424 or 426 are thus brought into cooperative engagement with their associated bell cranks, further means is provided for bringing levers 422 or 423, or 434 or 435 into cooperative engagement with their respective bell cranks. To effect this control, magazine shift member 424 is provided with a bracket 451 which is articulated to a link 452 pivotally carried on keylever 453. Member 424 is also provided with a bracket 454 to which is articulated a link 455 pivotally carried on a keylever 456. At the extremity of bracket 454 is pivoted the lower end of a link 457, the upper end of which is pivoted to a bracket 458 secured to the upper magazine shift member 436. Thus, when keylever 456 is actuated, magazine shift member 424 will, through link 455, be rotated to its counterclockwise position to be held thereat by a spring actuated detent member 459. Similar clockwise rotation will be imparted through link 457 to upper magazine shift member 436. To return magazine shift members 424 and 436 to their clockwise position, keylever 453 is actuated which, through link 452, effectuates this rotation.

With the structure just disclosed, it is seen that to bring lever 422 into cooperative engagement with bell crank 425 to control the counting elements 427 carried in counting magazine 411, it is necessary first to operate keylever 448 which will advance the lower magazine shift member 424 toward the bell cranks 425 and 426, following which keylever 453 is actuated, which will bring lever 422 into cooperative engagement with bell crank 425. Similarly, to bring lever 423 into operative engagement with bell crank 426, it is necessary first to operate keylever 448 and then to follow this operation with the actuation of keylever 456. Likewise, to bring lever 434 into cooperative engagement with bell crank lever 437, it is necessary first to operate keylever 447 and then to follow with the actuation of keylever 453. Finally, to bring lever 435 into cooperative engagement with bell crank lever 438, keylever 447 is first operated, which is followed by the actuation of keylever 456.

*Alternate ratchet feed lever mechanism*

Figure 17:
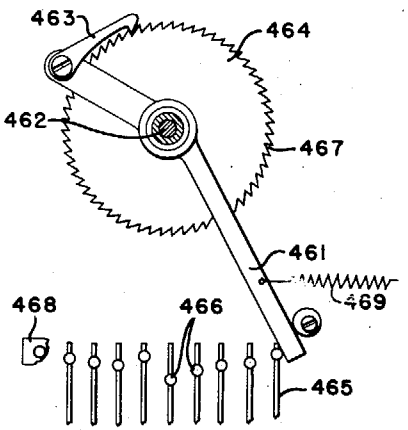
Fig. 17 is a modification of the counting ratchet feed mechanism.

In Fig. 17 is shown an alternative arrangement for imparting evenly spaced increments of angular motion to the ratchet feed lever 461 which is analogous to ratchet feed levers 153, 154, or 155. In this illustration, lever 461 is shown as being pivotally carried on the hub of its associated ratchet wheel 464, which, in turn, is carried on a shaft 462 which is coincident with the center line of the shafts (comparable to shafts 179, 186 and 204) contained in the differential accumulator unit. In contradistinction to the showing of the ratchet feed lever mechanism of the principal embodiment, as shown in Fig. 1, the view shown in Fig. 17 is taken from the rear of the apparatus. To the opposite end of lever 461 is carried a pawl 463 which cooperates with a feed ratchet 464. In the arrangement shown, the uniformly spaced stop levers 465 (analogous to stop levers 146, 151, and 152) are provided with individual counting stop pins 466. Pins 466 are arranged as shown at a predetermined and calculated distance from a reference line in such a manner that lines drawn through the center of rotation of shaft 462 and tangent to stop pins 466 will define equal angular distances, and hence ratchet feed lever 461 will be rotated evenly spaced angular distances corresponding to the angle between two teeth 467 on ratchet 464. Here again nine identical stop bars 465 can be guided in a casting 468 having parallel slots similar to guide casting 149 (Fig. 1). Thus, when ratchet feed lever 461 is actuated in a clockwise direction by mechanism similar to that shown in Fig. 1, controlled by a cam 165, its rotation will be arrested by a stop pin 466 on an operated stop bar 465, causing pawl 463 to advance clockwise over the teeth 467, picking up a number of teeth equivalent to the numerical position of the stop pin 466. Thence, upon the counterclockwise rotation of lever 461 due to the pull of a spring 469, ratchet wheel 464 will be rotated a corresponding angular amount.

In actual use the perforator equipped with the exact matrix size counting mechanism, as described in the foregoing specification, may be equipped with the unit indicator, the thousandths indicator or both. Provision is made in this perforator for a multiplicity of interchangeable counting magazines, and each counting magazine may be equipped with counting elements corresponding in arrangement and counting values with the arrangement and matrix sizes of a font of matrices as channeled in a corresponding linecasting machine storage magazine. Further, each counting magazine position in the perforator may be assigned to count matrix sizes in a particular storage magazine position of the linecasting machine, so that a definite correspondence may be established between the matrix sizes selectively counted by the perforator, and the matrices selectively released for assembly in the linecasting machine. Accordingly, this perforator may be used to prepare a continuous tape for automatic control of multi-magazine linecasting machines, and may be equipped with an arrangement of counting magazines to correspond with any arrangement of matrix storage magazines which may be installed on the linecasting machine being controlled.

Although the present invention has been disclosed and described with reference to the preparation of a record form for the control of a linecasting machine, it is, of course, understood that the invention is capable of embodiment in many and widely varied forms other than that specifically disclosed without departing from the spirit and scope of the present invention.

What is claimed is:

1. In combination, an element movable in variable additive amounts, a periodically operable instrumentality, a source of power for operating said instrumentality periodically, a plurality of rotatable impellers, means acting by negative operation for conditioning said impellers permutably for rotation by said instrumentality, and a differential accumulator interposed between said impellers and said element operative to move said element an amount proportioned to the combined rotations of said impellers by said instrumentality.

2. In an apparatus for preparing control strips for linecasting machines, a selector mechanism comprising a plurality of removable and interchangeable units, a differential accumulator actuated through said units in varying cumulative amounts representative of matrix widths, an indicator comprising a scale and a matrix pointer movable with respect thereto, and means for transmitting the movements of said accumulator to said pointer.

3. In combination with a keyboard device for producing perforated strips to control composing machines utilizing different fonts of type, a plurality of keys, selecting mechanism operable in accordance with the operation of said keys comprising a plurality of detachable and removable code bar units, each corresponding to a font of type, means for selecting a code bar unit to be operated, and means to select the group of code bars to be operated.

4. In combination, a plurality of keys, a magazine shift device, a case shift device, a pair of removable and interchangeable code bar units operably associated with said shift devices, a series of selector vanes associated with each code bar unit, a series of stop bars, means controlled by said vanes for operating said stop bars, ratchet feed means associated with said stop bars, a shaft, differential means operative under control of said ratchet feed means to effect the incremental progressive movement of said shaft, and indicating means controlled by said shaft.

5. In combination in a keyboard device, a plurality of keys, a pair of removable and interchangeable code bar units each comprising a pair of counting elements for each key, a magazine shift device for determining which of the pair of units is to be operated, and a case shift device for determining which of the pair of counting elements is to be operated.

6. In combination in a keyboard device, a plurality of keys, a pair of removable and interchangeable code bar units each comprising a pair of counting elements for each key, a case shift device for determining which of the pair of counting elements is to be operated, a plurality of pairs of bell crank levers carried by said case shift device, each lever associated with a pair of said counting elements, a magazine shift device comprising two series of levers, one series associated with corresponding ones of said pairs of bell cranks, and means controlled by said keys and acting through said devices to selectively control the counting elements to be operated.

7. In combination in a keyboard device, a plurality of keys, a pair of removable and interchangeable code bar units, each comprising a pair of counting elements for each key, a magazine shift device for determining which of the pair of units is to be operated, a case shift device for determining which of the pair of counting elements is to be operated, a differential means, and means common to said units and operably controlled through the instrumentality of said devices by the actuation of said keys to control said differential means.

8. In combination, a plurality of keys, a magazine shift device, a case shift device, a pair of removable and interchangeable code bar units operably associated with said shift devices, a series of selector vanes associated with each code bar unit, a series of stop bars, means controlled by said vanes for operating said stop bars, ratchet feed means associated with said stop bars, differential means operative under control of said ratchet feed means, a unit indicator comprising a rotatable dial and a pointer rotatable oppositely thereto, and means associated with said differential means for converting a decimal indication into a non-decimal indication.

9. In a keyboard device, a plurality of keys, a counting device comprising means to totalize variable additive amounts and to indicate continuously such totalizations, said means including a plurality of planetary gear mechanisms, means to rotate said mechanisms variable amounts in a certain direction according to the keys depressed, a plurality of unidirectional indicators operable variably to correspond to the operation of said mechanisms, and means to rotate said indicators simultaneously to a predetermined starting position.

10. In a keyboard device, a plurality, of keys, a counter device comprising a uni-directional totalizing wheel system to totalize variable additive amounts and to indicate continuously such totalizations including a plurality of planetary gear mechanisms, a series of stop bars associated with each totalizing wheel, a selector mechanism operatively associated with said keys and adapted to selectively operate said stop bars according to the key operated, and a totalizing wheel stop lever associated with each series of stop bars and adapted to coact therewith to control the incrementally progressive movements of the totalizing wheels and to actuate said counting device correspondingly.

11. In an apparatus, an indicator, a differential accumulator comprising a plurality of planetary gear mechanisms, a plurality of nested shafts operatively connected to said indicator and said mechanisms, and means for controlling the joint or individual operation of said mechanisms for determining through said shafts the position of said indicator.

12. In an apparatus, a differential accumulator comprising a plurality of planetary gear mechanisms, a plurality of denominational indicators, a plurality of nested shafts, each operatively connected between an indicator and its corresponding gear mechanism, and means for controlling the joint or individual operation of said mechanisms for determining the positions of said indicators.

13. In a device, a differential accumulator comprising a plurality of planetary gear mechanisms, a scale mechanism associated with one of said gear mechanisms, a pointer associated with another of said gear mechanisms, and means for rendering said differential accumulator effective to cause relative motion between said scale and said pointer for converting a decimal indication into a non-decimal indication.

14. In a device, a differential accumulator comprising a plurality of planetary gear mechanisms, a scale mechanism associated with one of said gear mechanisms, a pointer associated with another of said gear mechanisms, means for rendering said differential accumulator effective to cause relative motion between said scale and said pointer for converting a decimal indication into a non-decimal indication, and manual means for further determining the operable relationship between said scale and said pointer.

15. In a device, a differential accumulator comprising a plurality of planetary gear mechanisms, a scale mechanism associated with one of said gear mechanisms, a pointer associated with another of said gear mechanisms, means for rendering said differential accumulator effective to cause relative motion between said scale and said pointer for converting a decimal indication into a non-decimal indication, and slidable means operably associated with said scale for defining the effective range of movement between said scale and said pointer.

16. In a device, a differential accumulator comprising a plurality of planetary gear mechanisms, a scale mechanism associated with one of said gear mechanisms, a pointer associated with another of said gear mechanisms, means for rendering said differential accumulator effective to cause relative motion between said scale and said pointer for converting a decimal indication into a non-decimal indication, and means effective under certain operating conditions for limiting the relative movement between said scale mechanism and said pointer.

17. In a keyboard device, a plurality of keys, a counting device comprising a uni-directional totalizing wheel system to totalize variable additive amounts and to indicate continuously such totalizations including a plurality of planetary gear mechanisms, a series of stop bars associated with such totalizing wheel, a selector mechanism operatively associated with said keys and adapted to selectively operate said stop bars according to the key operated, a totalizing wheel stop bar lever associated with each series of stop bars and adapted to coact therewith to control the incrementally progressive movements of the totalizing wheels and to actuate said counting device correspondingly, and means for adjusting the effective actuations of said stop bars.

18. In combination, a plurality of keys, a series of selector vanes, a series of stop bars, mechanical interconnection between said vanes and said stop bars, means controlled by said keys for operating said stop bars, ratchet feed mechanisms associated with said stop bars, a shaft, differential means operative under control of said ratchet feed means to effect the incrementally progressive movement of said shaft, and indicating means controlled by said shaft.

19. In combination, a plurality of keys, a series of selector vanes, a series of stop bars, mechanical interconnection between said vanes and said stop bars, means controlled by said keys for operating said stop bars, ratchet feed mechanisms associated with said stop bars, a shaft, differential means operative under control of said ratchet feed means to effect the incrementally progressive movement of said shaft, indicating means controlled by said shaft, and means cooperable with said vanes for adjusting the effective actuations of said stop bars.

20. In combination, a plurality of keys, a series of selector vanes, a series of stop bars, mechanical interconnection between said vanes and said stop bars, means controlled by said keys for operating, through said vanes, said stop bars, ratchet feed mechanisms associated with said stop bars, a plurality of nested shafts, differential means operative under control of said ratchet feed means to effect the incrementally progressive movement of said shafts, and a plurality of denominational indicators controlled by said shafts.

21. In combination, a plurality of keys, a series of stop bars, means controlled by said keys for operating said stop bars, ratchet feed mechanism associated with said stop bars, a plurality of nested shafts, differential means operative under control of said ratchet feed means to effect the incrementally progressive movement of said shafts, and a plurality of denominational indicators controlled by said shafts.

22. In a keyboard device, a plurality of keys, a counting device comprising a plurality of ratchet feed mechanisms, a plurality of groups of stop bars, a selector mechanism comprising a detachable and removable code bar unit comprising a plurality of pairs of code members, one pair individual to each keylever, said mechanism operatively associated with said keys and adapted to selectively control said stop bars according to the key operated, and a pawl mechanism associated with each group of stop bars and adapted to coact therewith to control the actuations of said ratchet feed mechanisms in varying amounts and to actuate said counting device in a corresponding manner.

23. In a keyboard apparatus, a series of keys, a counting mechanism comprising a plurality of totalizing wheel mechanisms, a plurality of groups of stop bars, a unit carrying a plurality of pairs of code bars, means to control the operation of the counting mechanism according to the setting of said bars, said code bar unit being adapted to be interchangeably insertable in the apparatus for interchange according to the font of type to be used, operative connection between the keys and the code bars such that the totalizing wheel mechanisms may be operated in a plurality of ways for each key, and means to select the way in which the totalizing mechanisms are to be operated.

24. In a keyboard device, a plurality of keys, a counting device comprising means to totalize variable additive amounts and to indicate continuously such totalization, said means including a plurality of ratchet feed mechanisms, variably operated pawl means to rotate said mechanisms variable amounts according to the keys depressed, planetary gear systems interconnected between said feed mechanisms, and uni-directional indicating means operated through said gear systems by the joint or several operations of said feed mechanisms.

25. In an apparatus for preparing control strips for linecasting machines, a counting device, means for actuating said device including a series of differential instrumentalities, a plurality of stop members associated with each differential instrumentality, means for selectively operating said stop members, and means for operating said instrumentalities to cause their cooperation with said members to effect the corresponding operation of the counting device.

26. In an apparatus for preparing control strips for linecasting machines, a counting device, means for actuating said device including a series of differential agencies, a plurality of stop members associated with each agency, selecting means comprising a plurality of detachable and removable code bar units, each corresponding to a font of type, for selectively operating said stop members, and means for operating said agencies to cause their cooperation with said members to effect the corresponding operation of the counting device.

27. In a device for preparing control strips for linecasting machines, a counting mechanism operated in incremental amounts representative of matrix widths, a plurality of differential agencies, selector vanes associated with each agency, and means operable through said vanes and cooperating with said agencies for determining the extent of operation of said counting mechanism.

28. In a device for preparing control strips for linecasting machines, a counting mechanism operated in incremental amounts representative of matrix widths, a plurality of differential agencies, selector vanes associated with each agency, and detachable and interchangeable code bar units provided with a plurality of coded elements selectively and operably related thereto for determining the extent of operation of said counting mechanism.

29. In a device for preparing control strips for linecasting machines, a counting mechanism operated in incremental amounts representative of matrix widths, a plurality of elements, permutation means comprising a plurality of members, detachable and interchangeable code bar units provided with a plurality of coded elements selectably and operably related to said members for operating said members in varying combinations to actuate said elements in accordance with various widths of the matrices, and differential means controlled through said permutation means and coacting with said elements for determining the extent of operation of said counting mechanism.

30. In a keyboard apparatus, a plurality of keys, a counting device comprising means to totalize variable additive amounts and to indicate continuously such totalizations, said means including a plurality of planetary gear mechanisms, means to rotate said mechanisms variable amounts in a certain direction according to the keys depressed, a plurality of unidirectional indicators operable variably to correspond to the operation of said mechanisms, manually controlled means for effecting a pre-setting of said indicators to predetermined positions, and means operable cyclically for automatically restoring said indicators to said pre-set positions.

31. In a keyboard apparatus, a plurality of keys, a counting device comprising means to totalize variable additive amounts and to indicate continuously such totalizations, said means including a plurality of planetary gear mechanisms, means to rotate said mechanisms variable amounts in a certain direction according to the keys depressed, a plurality of unidirectional indicators operable variably to correspond to the operation of said mechanisms, manually controlled means for effecting a pre-setting of said indicators to predetermined positions, and means operable cyclically for automatically restoring said indicators to said pre-set positions, said pre-setting means including indicators affording substantially continuous display of said pre-set indication.

32. In a keyboard apparatus, a plurality of keys, a counting device comprising means to totalize variable additive amounts and to indicate continuously such totalizations, said means including a plurality of planetary gear mechanisms, means to rotate said mechanisms variable amounts in a certain direction according to the keys depressed, a plurality of unidirectional indicators operable variably to correspond to the operation of said mechanisms, manually controlled means for effecting a pre-setting of said indicators to predetermined positions, and means operable cyclically for automatically restoring said indicators to said pre-set positions, said pre-setting means including indicators affording substantially continuous display of said pre-set indication, and said last mentioned indicators simultaneously traversing their entire ranges of indications during restoration of the first mentioned indicators.

33. In a keyboard apparatus, a plurality of keys, a counting device comprising means to totalize variable additive amounts and to indicate continuously such totalizations, said means including a plurality of planetary gear mechanisms, means to rotate said mechanisms variable amounts in a certain direction according to the keys depressed, a plurality of unidirectional indicators operable variably to correspond to the operation of said mechanisms, manually controlled means for effecting a pre-setting of said indicators to predetermined positions, and means operable cyclically for automatically restoring said indicators to said pre-set positions, said pre-setting means including unidirectionally effective sweeper means individual to each indicator for imparting rotation of the indicator into pre-set position.

34. In combination in a keyboard apparatus, a plurality of keys, a pair of removable and interchangeable code bar units each comprising a plurality of counting elements for each key, a magazine shift device for determining which of the pair of units is to be operated, and a case shift device for selecting between said counting elements.

35. In combination in a keyboard apparatus, a plurality of keys, a pair of removable and interchangeable code bar units, each including a plurality of groups of counting bodies for each key lever and supporting means therefor, a magazine shift device for determining which of the pair of units is to be operated, a case shift device for determining which of the groups of counting bodies is to be operated, a differential means, and means common to said units and operably controlled through the instrumentality of said devices by the actuation of said keys to control said differential means.

36. In a counting and indicating apparatus, a differential accumulator comprising a plurality of planetary gear mechanisms, a scale mechanism associated with one of said gear mechanisms, a pointer associated with another of said gear mechanisms, said scale having a plurality of apertures therein, a member having a plurality of pins extending through the apertures in said scale, selectably operable means for projecting said pins through said scale sufficiently to present them in the path of movement of said pointer, and manually operable means for withdrawing said pins from said apertures and for rotating said pin carrying member relative to said scale.

37. In a counting and indicating apparatus, a differential accumulator comprising a plurality of planetary gear mechanisms, a dial operable unidirectionally by one of said gear mechanisms, a pointer operable unidirectionally by another of said gear mechanisms in a direction opposite to that of said dial, said dial having a plurality of uniformly spaced apertures at equal radial distances from the axis thereof, an axially slidable and rotatable member coaxial with said dial and supporting pins extending through diametrically opposite apertures in said dial whereby said member is rotatable with said dial, selectably operable means for projecting said pins into the path of said pointer, and manually operable means for withdrawing said pins from the apertures in said dial and for rotating said member with respect to said dial to change the positions of said pins with respect to graduations on said dial.

38. In a keyboard apparatus, a plurality of keys, a plurality of uniformly spaced stop bars to be selectively actuated by said keys, an indicator, a differential gear mechanism for operating said indicator, a ratchet for operating said gear mechanism, and a pawl mechanism for operating said ratchet, said pawl mechnism having an arm to be arrested by a key-actuated stop bar, said arm contoured to afford equal angular movements of said pawl between the stop positions established by said stop bars.

39. In combination, a plurality of keys, a magazine shift device, a case shift device, a pair of removable and interchangeable code bar units operably associated with said shift devices, a series of selector vanes associated with each code bar unit, a series of stop bars, means controlled by said vanes for operating said stop bars, ratchet feed means associated with said stop bars, differential means operative under control of said ratchet feed means, a unit indicator comprising a rotatable dial and a pointer rotatable oppositely thereto, and means associated with said differential means for converting from one counting system to another.

40. In combination, a plurality of keys, a series of selector vanes, a series of stop bars, mechanical interconnection between said vanes and said stop bars, means controlled by said keys for operating said stop bars, ratchet feed mechanisms associated with said stop bars, power actuated means for controlling the operation of said ratchet feed mechanisms, a shaft, differential means operative under control of said ratchet feed means to effect the incrementally progressive movement of said shaft, and indicating means controlled by said shaft.

41. In combination, a plurality of keys, a series of selector vanes, a series of stop bars, mechanical interconnection between said vanes and said stop bars, means controlled by said keys for operating said stop bars, ratchet feed means associated with said stop bars, power actuated means for controlling the association of said ratchet feed means with said stop bars, means conditioned during the operation of said power actuated means for completing the operation of said ratchet feed mechanisms, a shaft, differential means operative under control of said ratchet feed means to effect the incrementally progressive movement of said shaft, and indicating means controlled by said shaft.

42. In combination, a plurality of keys, a series of selector vanes, a series of stop bars, mechanical interconnection between said vanes and said stop bars, means controlled by said keys for operating said stop bars, ratchet feed means associated with said stop bars, power actuated means for conditioning said ratchet feed means for operation, spring means conditioned by said power actuated means for operating said ratchet feed means, differential means operative under control of said ratchet feed means to effect the incrementally progressive movement of said shaft, and indicating means controlled by said shaft.

43. In combination, a plurality of keys, a magazine shift device, a case shift device, a pair of removable and interchangeable code bar units operably associated with said shift devices, a series of selector vanes associated with each code bar unit, a series of stop bars, means controlled by said vanes for operating said stop bars, ratchet feed means associated with said stop bars, a decimal accumulator operative under control of said ratchet feed means, a unit indicator comprising a rotatable dial and a pointer rotatable oppositely thereto, and means associated with said decimal accumulator for converting a decimal indication into a nondecimal indication.

44. In combination with a keyboard device for producing perforated strips to control composing machines utilizing a plurality of matrix storage magazines, a plurality of keys, selecting mechanism operable in accordance with the operation of said keys comprising a plurality of detachable and removable code bar units, each corresponding to a matrix storage magazine, means for selecting a code bar unit to be operated, and means to select the code bars to be operated.

45. In combination with a keyboard device for producing perforated strips to control composing machines having a plurality of matrix storage magazines from which matrices may be released selectably, a plurality of keys, selecting mechanism operable in accordance with the operation of said keys comprising a plurality of detachable and removable code bar units, each code bar unit corresponding to a particular matrix storage magazine, means for selecting a code bar unit to be operated, and means to select the code bars thereof to be operated.

46. In combination, a plurality of keys, a magazine shift device, a case shift device, a pair of removable and interchangeable code bar units operably associated with said shift devices, a series of selector vanes associated with each code bar units, a series of stop bars, means controlled by said vanes for operating said stop bars, ratchet feed means associated with said stop bars, a shaft, differential means operative under control of said ratchet feed means to effect the incremental progressive movement of said shaft, and space accumulation means controlled by said shaft.

47. In a counting and indicating apparatus, a differential accumulator comprising a plurality of planetary gear mechanisms, a scale mechanism associated with one of said gear mechanisms, a double ended pointer associated with one of said gear mechanisms, said scale having a plurality of apertures therein, a member having a pin extending through an aperture in said scale, selectably operable means for projecting said pin through said scale sufficiently to present it in the path of movement of said pointer, and manually operable means for withdrawing said pin from said aperture and for rotating said pin carrying member relative to said scale.

48. In combination with a keyboard device for producing perforated strips to control composing machines provided with a plurality of matrix storage magazines, a plurality of keys, selecting mechanisms operable in accordance with the operation of said keys comprising a plurality of detachable and removable code bar units, each corresponding to a matrix storage magazine and including a plurality of groups of code bars, means for selecting a code bar unit to be operated, and means to select the group of code bars to be operated.

49. In combination with a keyboard device for producing perforated strips to control composing machines provided with a plurality of matrix storage magazines, a plurality of keys, selecting mechanism operable in accordance with the operation of said keys comprising a plurality of detachable and removable code bar units, each corresponding to a matrix storage magazine and including a plurality of groups of code bars, means for selecting a code bar unit to be operated, means for selecting the group of code bars in said unit to be operated, and means for controlling the perforation of signal combinations corresponding to the code bar unit selected and the group of code bars selected.

50. In combination in a keyboard device, a plurality of keys, a plurality of removable and interchangeable code bar units each including a pair of counting elements for each key, a case shift device for determining which of the pair of counting elements is to be operated, a plurality of pairs of bell crank levers carried by said shift device, each lever associated with a pair of said counting elements, a magazine shift device corresponding to each pair of code bar units and comprising a plurality of pairs of levers, the levers of a pair arranged to be associated alternatively with corresponding bell cranks of said pairs of bell cranks, and means controlled by said keys and acting through said devices for selectively controlling the counting elements to be operated.

51. In combination in a keyboard device, a plurality of key levers, a plurality of removable and interchangeable code bar units each including a pair of counting elements for each key lever, a magazine shift device for determining which of the code bar units is to be operated, a case shift device for determining which of the pair of counting elements in the selected code bar unit is to be operated, and a removable and interchangeable assembly of manually operable keys associated with said key levers.

52. In combination in a keyboard device, a plurality of key levers, a plurality of removable and interchangeable code bar units corresponding to matrix storage magazines of a linecasting and composing machine and including a pair of counting elements for each key lever, a magazine shift device for determining which of the code bar units is to be operated, a case shift device for determining which of the pairs of counting elements of the selected code bar units is to be operated, and an assembly of keys for said key levers removable and interchangeable as a unit, said keys having abutting engagement only with said key levers.

53. In combination in a keyboard device, a plurality of pairs of stationary rails and a counting code bar unit removably supported by each pair of rails, said counting code bar units comprising a foundation member having a plurality of parallel slots, and a plurality of code bars slidably supported in said slots.

54. In combination in a keyboard device, a plurality of pairs of stationary rails, and a plurality of key lever controlled code bar units removably supported by said rails, said code bar units comprising a foundation member having a plurality of parallel slots, a plurality of code bars slidably supported in said slots, and means for removably retaining said code bars in said foundation member.

55. In combination in a keyboard device, a plurality of pairs of stationary rails, and a plurality of key lever controlled code bar units removably supported by said rails, said code bar units comprising a foundation member having a plurality of parallel slots, a plurality of code bars slidably supported in said slots, a retainer plate supported by said foundation member, and cooperating retaining fingers integral with said code bars and presented under said retainer plate for confining displacement of said code bars to longitudinal movement.

56. In combination in a keyboard device, a plurality of pairs of stationary rails, and a plurality of key lever controlled code bar units removably supported by said rails, said code bar units comprising a foundation member having a plurality of parallel slots, a plurality of code bars slidably supported in said slots, a retainer plate supported by said foundation member, cooperating retainer fingers integral with said code bars and presented under said retainer plate for confining displacement of said code bars to longitudinal movement, and means for restricting the longitudinal movement of said code bars to prevent retraction of said fingers from under said retainer plate.

57. In combination in a keyboard device, a plurality of stationary rails, and a plurality of key lever controlled code bar units removably supported by said rails, said code bar units comprising a foundation member having a plurality of parallel slots, a plurality of sets of code bars slidably supported in the slots of each of said foundation members, corresponding ones of the code bars in the sets supported by a foundation member being aligned endwise for imparting movement from one to another, a retainer plate supported by the foundation member below each set of code bars, cooperating retainer fingers integral with said code bars and presented under said retainer plate for confining displacement of said code bars to longitudinal movement, and a removable bar extending transversely of the foundation member beneath one of the sets of code bars for preventing retraction of all of the code bars supported by that foundation member sufficiently to free the retainer fingers from restriction by the retainer plate.

58. In combination in a keyboard device, a plurality of key levers, and a removable and interchangeable code bar unit to be controlled by said key levers including a plurality of aligned code elements pertinent to the key levers, each of the code elements being one of a maximum of nine types of code elements.

59. In combination in a keyboard device, a plurality of key levers, and a plurality of removable and interchangeable code bar units to be controlled selectively by said key levers, each code bar unit comprising a plurality of alignments of code elements individual to each of certain of the key levers, each of the code elements being one of a maximum of nine types of code elements.

60. In combination in a keyboard device, a plurality of key levers, a removable and interchangeable code bar unit to be controlled by said key levers, and a plurality of sets of counting elements to be controlled by said code bar unit, said code bar unit including a plurality of code elements associated with each set of counting elements, each of the code elements being one of a number of types not exceeding the number of counting elements in a set.

61. In a keyboard apparatus, a plurality of keys, an indicator, a ratchet for operating said indicator, a pawl mechanism for operating said ratchet, and means controlled by said keys for arresting said pawl mechanism in positions representing uniform angular steps of movement.

62. In a keyboard apparatus, a plurality of keys, an indicator, a ratchet for operating said indicator, a pawl for operating said ratchet, pivoted means for actuating said pawl, a plurality of coaxially pivoted and uniformly spaced stop bars controlled by said keys for arresting said pivoted means, and means for equalizing the angular movement of said pivoted means between positions of arrestment by any two adjacent ones of said stop bars.

63. In a keyboard apparatus, a plurality of keys, an indicator, a ratchet for operating said indicator, a pawl for operating said ratchet, pivoted means for actuating said pawl, a plurality of coaxially pivoted and uniformly spaced stop bars controlled by said keys for arresting said pivoted means, and means carried by each of said stop bars at varying distance from the center of rotation of said pivoted means for equalizing the angular movement of said pivoted means between positions of arrestment by any two adjacent ones of said stop bars.

64. In combination, an element movable in variable additive amounts, a periodically operable instrumentality, a source of power for operating said instrumentality periodically, a plurality of impellers, means acting by negative operation for conditioning said impellers permutably for variable movement by said instrumentality, and a differential accumulator interposed between said impellers and said element operative to move said element an amount proportioned to the combined variable movements of said impellers by said instrumentality.

65. In combination, an element movable in variable additive amounts, a periodically operable instrumentality, a source of power for operating said instrumentality periodically, a plurality of rotatable impellers, means acting by negative operation for conditioning said impellers for variable rotation by said instrumentality, and a differential accumulator interposed between said impellers and said element operative to move said element an amount proportioned to the combined variable rotations of said impellers by said instrumentality.

66. In a device for preparing control strips for line casting machines, a counting mechanism operated in incremental amounts representative of matrix widths comprising an indicator having an index member, actuating means, a source of power for said actuating means, a plurality of driving means, a plurality of differential mechanisms, and permutation means acting by negative operation for conditioning said driving means for movement under the control of said actuating means selectively in permutational combinations for thereafter operating said mechanisms in accordance with various widths of the matrices to effect corresponding actuations of the index member of said mechanism.

67. Means for totalizing variable additive amounts and to indicate continuously such totalization comprising a movable part, actuating means having a fixed range of movement, a source of power for moving said actuating means through its fixed range, a plurality of driving means, means acting by negative operation for conditioning said driving means for movement under the control of said actuating means selectively in different permutational combinations, and differentially operating means interposed between said driving means and said movable part operative to move said part in accordance with the combined movements of said driving means under said control of said actuating means.

68. In combination, an indicator having an incrementally movable index member, an actuating member having a fixed range of movement, a source of power for moving said member through its fixed range, a plurality of spring loaded mechanisms, means acting by negative operation for conditioning said mechanisms for movement under the control of said member selectively in different permutational combinations, and differentially operating means interposed between said mechanisms and the index member operative to move the index member in accordance with the combined movements of said mechanisms under said control of said actuating member.

69. In combination, a part movable in variable additive amounts, a periodically operable member, a source of power for operating said member periodically, a plurality of sets of elements, a plurality of drivingly rotatable impellers, one for each of said sets of elements, means for conditioning said impellers permutably for rotation under the control of said member, and a differential accumulator interposed between said sets of elements and said part and driven by said impellers operative to move said part an amount proportioned to the combined rotations of said impellers under the control of said member.

70. In combination, a part movable in variable additive amounts, a periodically operable member, a source of power for operating said member periodically, a plurality of elements, a plurality of drivingly rotatable instrumentalities, one at each of said elements, means for conditioning said instrumentalities permutably for rotation under the control of said member, and a differential accumulator interposed between said elements and said part and driven by said instrumentalities operative to move said part an amount proportioned to the combined rotation of said instrumentalities under the control of said member.

71. The combination with a part to be moved in incremental steps of varying length, of an actuating member, power driven means for moving said member, a plurality of elements, a drivingly rotatable instrumentality engaging each of said elements, means for conditioning said instrumentalities for movement under the control of said member selectively in different permutational combinations, and differentially operating means interposed between said elements and said part operative to move said part through a step proportioned to the combined movements of said instrumentalities under the control of said actuating member.

72. A selectively operable mechanism comprising, in combination with a part to be moved, an actuating member, means for moving said member, and means for transmitting the movement of said member to said part to move the latter in steps of varying amplitude comprising, a transmission mechanism having a plurality of elements, a drivingly rotatable impeller engaging each of said elements, a driven element operatively associated with said part, differentially operating means for combining movements imparted to selected ones of said impellers into a single movement in said driven element, and means rendering said actuating member operative to control the actuation of said impellers selectively in different permutational combinations.

73. In a selectively operable mechanism, the combination of a part to be moved, an actuating member, means for moving said member, a plurality of elements, a drivingly rotatable impeller engaging each of said elements, said impellers arranged to be conditioned selectively to be moved under the control of said member in any one of a plurality of different permutational combinations, and differentially operating means acting to transmit the combined movements of said impellers to said part in varying steps according to the permutational combination of the conditioned impellers.

74. In a selectively operable mechanism, the combination with a part to be moved in incremental steps of varying length, of an actuating member, power driven means for moving said member, drive mechanism including a series of differential units comprising a plurality of elements, a drivingly rotatable impeller engaging each of said elements, said mechanism connecting said member with the part to be moved, and selectively operable means acting on certain of said units for conditioning the drive mechanism to impart steps of different length to the part upon movement of the actuating member.

LEWIS R. COOK.
MAURUS T. GOETZ.